(12) United States Patent
Tuckfield et al.

(10) Patent No.: US 9,193,252 B2
(45) Date of Patent: Nov. 24, 2015

(54) TWO MOTOR ELECTRIC DRIVE HYBRID TRANSMISSION

(71) Applicants: Christopher A Tuckfield, Beverly Hills, MI (US); Klaus Kersting, Barcelona (ES)

(72) Inventors: Christopher A Tuckfield, Beverly Hills, MI (US); Klaus Kersting, Barcelona (ES)

(73) Assignee: FCA US LLC, Auburn Hills, MI (US)

(*) Notice: Subject to any disclaimer, the term of this patent is extended or adjusted under 35 U.S.C. 154(b) by 0 days.

(21) Appl. No.: 14/614,573

(22) Filed: Feb. 5, 2015

(65) Prior Publication Data

US 2015/0151625 A1    Jun. 4, 2015

Related U.S. Application Data

(62) Division of application No. 13/492,355, filed on Jun. 8, 2012, now abandoned.

(51) Int. Cl.
| | |
|---|---|
| *B60K 6/26* | (2007.10) |
| *B60K 6/365* | (2007.10) |
| *B60K 6/383* | (2007.10) |
| *B60K 6/387* | (2007.10) |
| *B60K 6/445* | (2007.10) |

(52) U.S. Cl.
CPC . *B60K 6/26* (2013.01); *B60K 6/365* (2013.01); *B60K 6/383* (2013.01); *B60K 6/387* (2013.01); *B60K 6/445* (2013.01); *Y02T 10/6239* (2013.01); *Y10S 903/906* (2013.01); *Y10S 903/911* (2013.01)

(58) Field of Classification Search
CPC .......... B60K 6/26; B60K 6/365; B60K 6/387; B60K 6/40; B60K 6/445; B60K 2006/266; B60K 2006/381; Y10S 903/906; Y10S 903/911; Y02T 10/6239; F16H 2200/0021; F16H 2200/2007; F16H 2200/2038
See application file for complete search history.

(56) References Cited

U.S. PATENT DOCUMENTS

| | | | |
|---|---|---|---|
| 7,278,941 | B2 | 10/2007 | Holmes et al. |
| 7,473,199 | B2 | 1/2009 | Bucknor et al. |
| 7,712,560 | B2 | 5/2010 | Kozarekar |
| 8,075,435 | B2 | 12/2011 | Si |
| 2010/0137091 | A1 | 6/2010 | Park et al. |
| 2013/0023368 | A1 | 1/2013 | Tamai et al. |
| 2014/0296013 | A1* | 10/2014 | Hata et al. .......... 475/5 |

OTHER PUBLICATIONS

International Search Report and Written Opinion dated Oct. 31, 2013 for International Application No. PCT/US2013/043355, International Filing Date May 30, 2013.

* cited by examiner

*Primary Examiner* — Jacob S Scott
(74) *Attorney, Agent, or Firm* — Ralph E. Smith

(57) ABSTRACT

A two motor electric drive hybrid transmission for a vehicle. The two motor electric drive hybrid transmission allows both electric motors to provide propulsive force during engine on and engine off operations when desired. The two motor electric drive hybrid transmission also provides improved and flexible operating configurations.

8 Claims, 20 Drawing Sheets

|  | $C_1$ | $C_2$ | $C_3$ | $C_4$ | $C_5$ |
|---|---|---|---|---|---|
| REVERSE |  |  | X |  | X |
| 1ST GEAR | X |  |  |  | X |
| 2ND GEAR | X |  |  | X |  |
| 3RD GEAR | X | X |  |  |  |
| 4TH GEAR |  | X |  | X |  |

FIG. 3
PRIOR ART

|  | $C_1$ | $C_2$ | DC |
|---|---|---|---|
| 1 MOTOR E-DRIVE LOW |  | X |  |
| 2 MOTOR E-DRIVE LOW | X | X |  |
| 2 MOTOR E-DRIVE HIGH | X |  |  |
| INPUT SPLIT |  | X | X |
| COMPOUND SPLIT | X |  | X |

FIG. 8

|  | $C_1$ | $C_2$ | DC |
|---|---|---|---|
| 1 MOTOR E-DRIVE LOW |  | X |  |
| 2 MOTOR E-DRIVE LOW | X | X |  |
| 2 MOTOR E-DRIVE HIGH | X |  |  |
| INPUT SPLIT |  | X | X |
| COMPOUND SPLIT | X |  | X |

FIG. 11

|  | $C_1$ | $C_2$ | $C_3$ | OWC |
|---|---|---|---|---|
| 1 MOTOR E-DRIVE (EMB) |  |  |  |  |
| 2 MOTOR E-DRIVE |  | X |  | X |
| SERIES |  |  | X |  |
| INPUT SPLIT |  | X |  |  |
| 1ST GEAR WITH A GEARED RELATIVE TO ENGINE AND B | X | X |  |  |
| 1ST GEAR WITH A AND B | X |  | X |  |
| 1ST GEAR WITH B ONLY | X |  |  |  |
| 3RD GEAR |  | X | X |  |

FIG. 14

|  | $C_1$ | $C_2$ | $C_3$ | $C_4$ | OWC |
|---|---|---|---|---|---|
| 1 MOTOR E-DRIVE |  | X |  | X |  |
| 2 MOTOR E-DRIVE |  | X |  | X | X |
| SERIES |  |  | X | X |  |
| INPUT SPLIT |  | X |  | X |  |
| 1ST GEAR WITH A GEARED RELATIVE TO ENGINE AND B | X | X |  | X |  |
| 1ST GEAR WITH A AND B | X |  | X | X |  |
| 1ST GEAR WITH B ONLY | X |  |  | X |  |
| 3RD GEAR WITH A AND B | X | X | X |  |  |
| 3RD GEAR WITH A ONLY |  | X | X |  |  |

FIG. 17

| | C1 | C2 | C3 | C4 | C5 | DC |
|---|---|---|---|---|---|---|
| 1 MOTOR EV MODE LOW RANGE | | | | | X | |
| 1 MOTOR EV MODE HIGH RANGE | | | | X | | X |
| SERIES MODE LOW RANGE | | | | | X | X |
| SERIES MODE HIGH RANGE | | | | X | X | |
| 2 MOTOR EV DRIVE - REV | | | X | | X | |
| 2 MOTOR EV DRIVE - 1ST GEAR | X | | | | | |
| 2 MOTOR EV DRIVE - 2ND GEAR | X | | | X | | |
| 2 MOTOR EV DRIVE - 3RD GEAR | X | X | | | | |
| 2 MOTOR EV DRIVE - 3RD GEAR ALT | | X | X | | | |
| 2 MOTOR EV DRIVE - 4TH GEAR | | X | | X | | |
| 2 MOTOR EV DRIVE - LOW RANGE | | | X | | X | |
| 2 MOTOR EV DRIVE - MED RANGE | | X | | X | | |
| ENGINE DRIVE - REV | | | X | | X | X |
| ENGINE DRIVE - 1ST GEAR | X | | | | X | X |
| ENGINE DRIVE - 2ND GEAR | X | X | | | | X |
| ENGINE DRIVE - 3RD GEAR | X | X | | | | X |
| ENGINE DRIVE - 3RD GEAR ALT | | X | X | | | X |
| ENGINE DRIVE - 4TH GEAR | | X | | X | | X |
| OUTPUT SPLIT LOW RANGE | | | X | | | X |
| OUTPUT SPLIT HIGH RANGE | | X | | | | X |

FIG. 20

TWO MOTOR ELECTRIC DRIVE HYBRID TRANSMISSION

CROSS REFERENCE TO RELATED APPLICATION

This application is a divisional application of U.S. Ser. No. 13/492,355, filed Jun. 8, 2012.

FIELD

The present disclosure relates to a two motor electric drive hybrid transmission, and more particularly to a two motor electric drive hybrid transmission in which both electric motors are capable of providing propulsion.

BACKGROUND

Many current hybrid transmissions feature two electric motors coupled to an internal combustion engine. Such hybrid transmissions provide vehicle operation while the internal combustion engine is both on and off. However, when driving with the engine off, typical hybrid transmissions utilize only one electric motor to provide propulsion while the other electric motor spins to allow the engine to remain stationary. This limits vehicle performance during electric operating modes. In addition, many typical transmissions and hybrid transmissions feature multiple and complex planetary gear sets that increase operating losses within the transmission. In hybrid transmissions, the electric motors must be properly sized to provide sufficient propulsive power while still meeting the packaging size requirements of the transmission. As larger motors are capable of providing greater propulsive force, there is an inherent tradeoff between utilizing an adequately powered motor and meeting the transmission packaging requirements. What is needed, therefore, is a hybrid transmission that utilizes one or both electric motors as desired while reducing the number of planetary gear sets in order to improve transmission efficiency.

SUMMARY

In one form, the present disclosure provides a hybrid transmission including an input shaft, a first clutch assembly, a first shaft coupled to the first clutch assembly, and an input planetary gear set coupled to the first shaft. The hybrid transmission also includes a first electric motor coupled to the input planetary gear set, an output planetary gear set coupled to the input planetary gear set, a second electric motor coupled to the output planetary gear set, and an output shaft coupled to the output planetary gear set. The first clutch assembly selectively couples the input shaft to the first shaft.

In another form, the present disclosure provides a hybrid powertrain comprising an input shaft, a first clutch assembly, a first shaft coupled to the first clutch assembly, and an input planetary gear set coupled to the first shaft. The hybrid powertrain also includes a first electric motor coupled to an input sun gear of the input planetary gear set, an output planetary gear set coupled to the input planetary gear set, a second electric motor coupled to an output sun gear of the output planetary gear set; and an output shaft coupled to the output planetary gear set. The first clutch assembly selectively couples the input shaft to the first shaft.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

BRIEF DESCRIPTION OF THE DRAWINGS

FIG. 3 is a table showing operating modes of the prior art transmission of FIG. 1;

FIG. 8 is a table showing exemplary operating modes of the two motor electric drive hybrid transmissions of FIGS. 4-6;

FIG. 11 is a table showing exemplary operating modes of the two motor electric drive hybrid transmission of FIG. 9;

FIG. 14 is a table showing exemplary operating modes of the two motor electric drive hybrid transmission of FIG. 12;

FIG. 17 is a table showing exemplary operating modes of the two motor electric drive hybrid transmission of FIG. 15;

FIG. 20 is a table showing exemplary operating modes of the two motor electric drive hybrid transmission of FIG. 18.

DETAILED DESCRIPTION

Before describing the disclosed embodiments of the technology in detail, it is to be understood that the disclosed technology is not limited in its application to the details of the particular arrangement shown herein since the technology is capable of other embodiments. Also, the terminology used herein is for the purpose of description and not of limitation.

Figure 1:
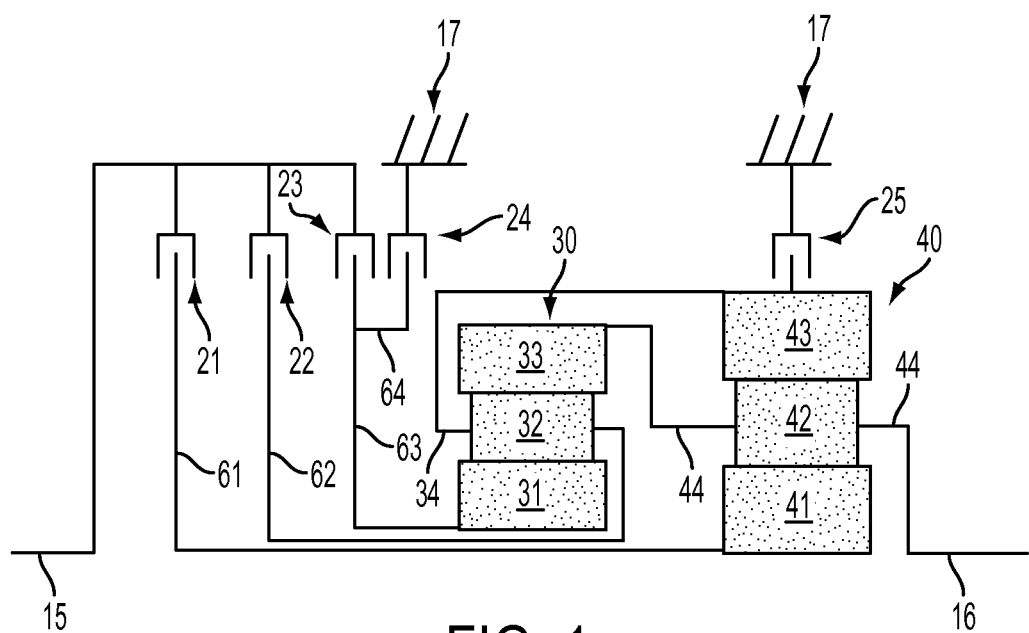
FIG. 1 is a schematic representation of a prior art transmission.

FIG. 1 is a schematic representation of a typical prior art transmission. The transmission includes an input shaft 15 coupled to a first clutch assembly 21, second clutch assembly 22, and third clutch assembly 23. The first clutch assembly 21 selectively couples the input shaft 15 to shaft 61, the second clutch assembly 22 selectively couples the input shaft 15 to shaft 62, and the third clutch assembly 23 selectively couples the input shaft 15 to a shaft 63 and shaft 64. The shaft 61 couples the first clutch assembly 21 to an output sun gear 41 of an output planetary gear set 40. The shaft 62 couples the second clutch assembly 22 to an input carrier 34 of an input planetary gear set 30 and, thereby, input pinion gears 32 of the input planetary gear set 30 rotatably mounted on the input carrier 34. The shaft 63 couples the third clutch assembly 23 to an input sun gear 31 of an input planetary gear set 30. The input sun gear 31 is continuously meshed with the input pinion gears 32. The shaft 64 couples the third clutch assembly 23 to a fourth clutch assembly 24. The fourth clutch assembly 24 selectively couples shaft 64 to the transmission housing 17, thereby selectively preventing rotation of the shaft 64 and all components coupled to shaft 64. The input pinion gears 32 are coupled by the input carrier 34 to an output ring gear 43 of the output planetary gear set 40. The output ring gear 43 is selectively coupled by a fifth clutch mechanism 25 to the transmission housing 17, thereby selectively preventing rotation of the output ring gear 43. An input ring gear 33 of the input planetary gear set 30 is continuously meshed with the input pinion gears 32 and coupled by an output carrier 44 of the output planetary gear set 40 to output pinion gears 42 of the output planetary gear set 40 rotatably mounted on the output carrier 44. The output pinion gears 42 are meshed with the output ring gear 43 and output sun gear 41. The output carrier 44 is coupled to the output shaft 16.

Figure 2:
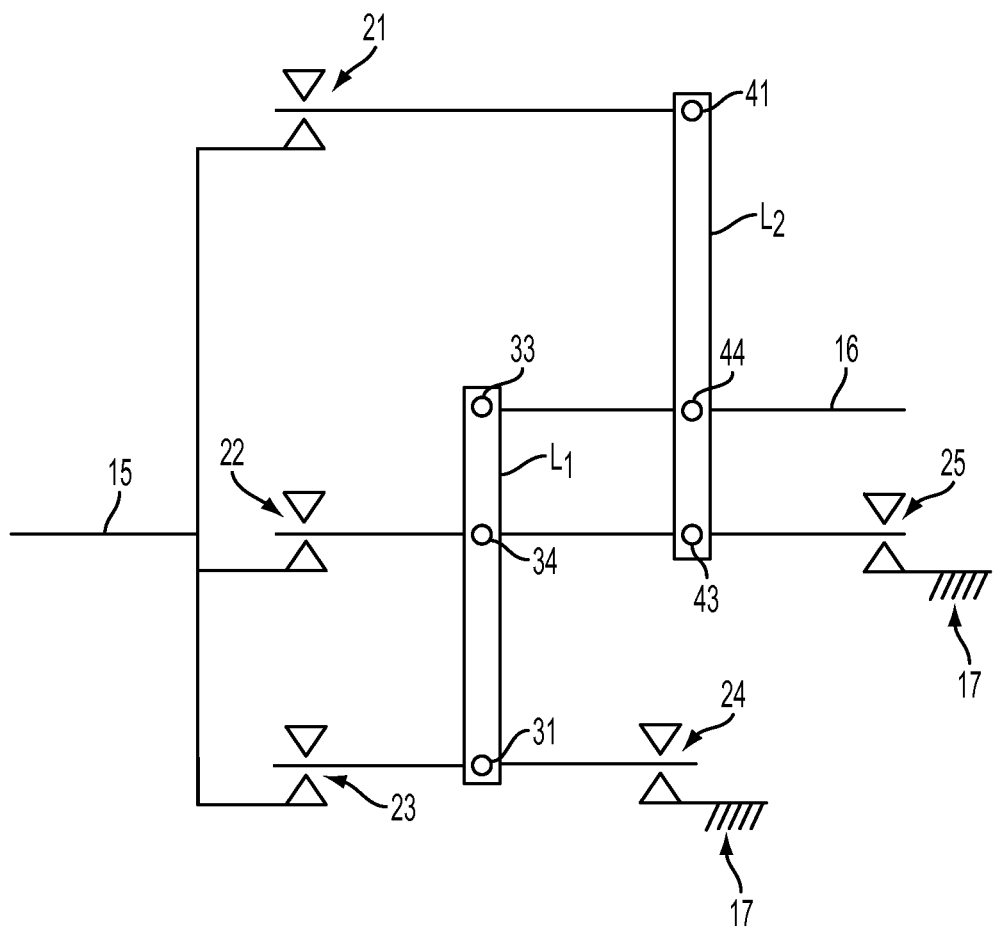
FIG. 2 is a lever diagram of the prior art transmission of FIG. 1.

FIG. 2 is an example lever diagram of the prior art transmission of FIG. 1. The lever diagram shows exemplary gearing relationships between the components of the prior art transmission. The gearing relationship between the input sun gear 31, input carrier 34, and input ring gear 33 is shown on lever L1. The gearing relationship between the output ring gear 43, output carrier 44, and output sun gear 41 is shown on lever L2.

FIG. 3 is a table showing exemplary operating modes of the prior art transmission. The prior art transmission of FIG. 1 may be operated in four forward gears (1st Gear, 2nd Gear, 3rd Gear, 4th Gear) and one reverse gear (Reverse). The first clutch assembly 21 (C1), second clutch assembly 22 (C2), third clutch assembly 23 (C3), fourth clutch assembly 24 (C4), and fifth clutch assembly 25 (C5) may be selectively activated to achieve the different operating states of the transmission. An "X" indicates that the clutch has been activated, thereby, coupling together all components to which it is attached. A blank indicates that the clutch has been deactivated, thereby, allowing the components to which it is coupled to rotate independently of one another.

With reference to FIGS. 1-3, when the prior art transmission is to be operated in a reverse gear (Reverse), the third and fifth clutch assemblies 23, 25 are activated, and the first, second, and fourth clutch assemblies 21, 22, 24 are deactivated. Thus, the input shaft 15 is coupled to the input sun gear 31 through the third clutch assembly 23 and shaft 63. Likewise, the output ring gear 43 is coupled through the fifth clutch assembly 25 to the transmission housing 17. Shaft 61 coupled to the output sun gear 41 and shaft 62 coupled to the input carrier 34 are free to rotate independently of the input shaft 15.

To operate the prior art transmission in a first gear ratio (1st Gear), the first and fifth clutch assemblies 21, 25 are activated, and the second, third, and fourth clutch assemblies 22, 23, 24 are deactivated. Thus, the input shaft 15 is coupled to the output sun gear 41 through the first clutch assembly 21 and shaft 61. Likewise, the output ring gear 43 is coupled through the fifth clutch assembly 25 to the transmission housing 17. Shaft 62 coupled to the input carrier 34 and shaft 63 coupled to the input sun gear 31 are free to rotate independently of the input shaft 15. Shaft 64 and the input sun gear 31 are also free to rotate.

To operate the prior art transmission in a second gear ratio (2nd Gear), the first and fourth clutch assemblies 21, 24 are activated, and the second, third, and fifth clutch assemblies 22, 23, 25 are deactivated. Thus, the input shaft 15 is coupled to the output sun gear 41 through the first clutch assembly 21 and shaft 61. Likewise, shafts 63, 64 and the input sun gear 31 are coupled to the transmission housing 17 through the fourth clutch assembly 24. Shaft 62 coupled to the input carrier 34 and shaft 63 coupled to the input sun gear 31 are free to rotate independently of the input shaft 15. The output ring gear 43 is also free to rotate.

To operate the prior art transmission in a third gear ratio (3rd Gear), the first and second clutch assemblies 21, 22 are activated, and the third, fourth, and fifth clutch assemblies 23, 24, 25 are deactivated. Thus, the input shaft 15 is coupled to the output sun gear 41 through the first clutch assembly 21 and shaft 61. Likewise, the input carrier 34 is coupled to the input shaft 15 through shaft 62 and the second clutch assembly 22. Shaft 63 coupled to the input sun gear 31 is free to rotate independently of the input shaft 15 and shafts 63, 64 and the input sun gear 31 are free to rotate. The output ring gear 43 is free to rotate.

To operate the prior art transmission in a fourth gear ratio (4th Gear), the second and fourth clutch assemblies 22, 24 are activated, and the first, third, and fifth clutch assemblies 21, 23, 25 are deactivated. Thus, the input shaft 15 is coupled to the input carrier 34 through the second clutch assembly 22 and shaft 62. Likewise, shafts 63, 64 and the input sun gear 31 are coupled to the transmission housing 17 through the fourth clutch assembly 24. Shaft 61 coupled to the output sun gear 41 and the output ring gear 43 are free to rotate.

Figure 4:
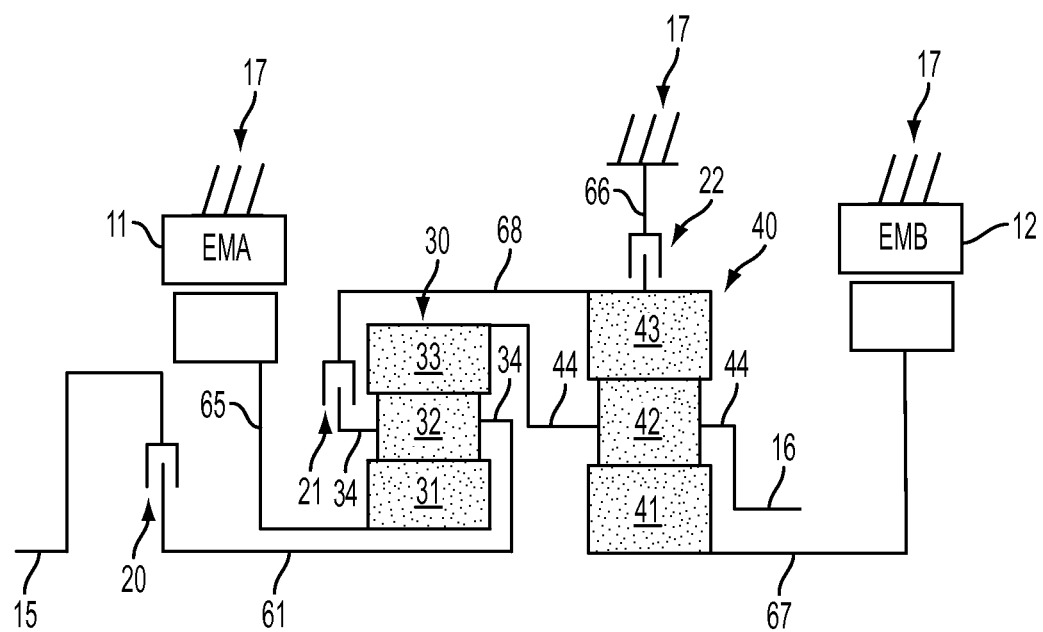
FIG. 4 is a schematic representation of an exemplary two motor electric drive hybrid transmission according to the principles of the present disclosure.

FIG. 4 illustrates an example schematic representation of an exemplary two motor electric drive hybrid transmission in accordance with a desired embodiment. The transmission includes an input shaft 15 coupled to a disconnect clutch assembly 20. The disconnect clutch assembly 20 selectively couples the input shaft 15 to a shaft 61. An activated clutch couples together all components to which it is attached. A deactivated clutch allows the components to which the clutch is coupled to rotate independently of one another. The shaft 61 couples the disconnect clutch assembly 20 to an input carrier 34 of an input planetary gear set 30 and, thereby, input pinion gears 32 of the input planetary gear set 30 that are rotatably mounted on the input carrier 34. The input pinion gears 32 are continuously meshed with an input sun gear 31 and an input ring gear 33 of the input planetary gear set 30. The input sun gear 31 is coupled by a shaft 65 to a first electric motor 11 ("EMA 11"). The input carrier 34 is also coupled to a first clutch assembly 21. The first clutch assembly 21 selectively couples the input carrier 34 to a shaft 68 coupled to an output ring gear 43 of an output planetary gear set 40. The output ring gear 43 is selectively coupled by a second clutch mechanism 22 through a shaft 66 to the transmission housing 17, thereby selectively preventing rotation of the output ring gear 43. The input ring gear 33 is coupled to an output carrier 44 of the output planetary gear set 40 and, thereby, output pinion gears 42 of the output planetary gear set 40 that are rotatably mounted on the output carrier 44. The output sun gear 41 is coupled by a shaft 67 to a second electric motor 12 ("EMB 12"). The output carrier 44 is coupled to the output shaft 16.

Figure 5:
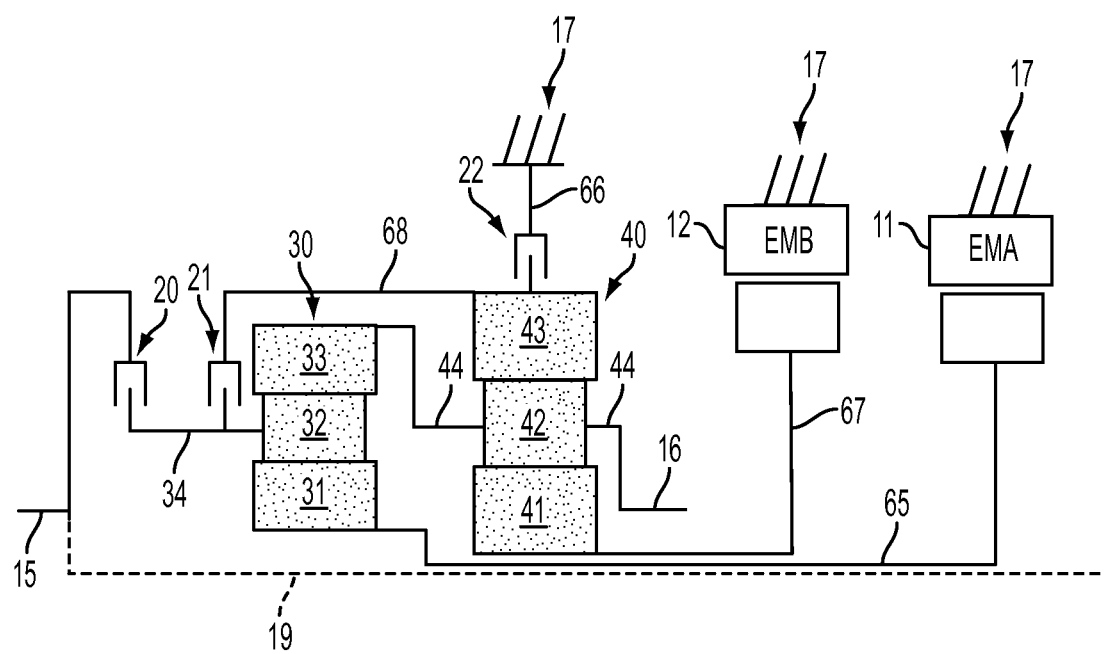
FIG. 5 is a schematic representation of another exemplary two motor electric drive hybrid transmission according to the principles of the present disclosure.

FIG. 5 illustrates an example schematic representation of another exemplary two motor electric drive hybrid transmission in accordance with another desired embodiment. The transmission includes an input shaft 15 coupled to a disconnect clutch assembly 20. The disconnect clutch assembly 20 selectively couples the input shaft 15 to the carrier 34 of an input planetary gear set 30 and, thereby, input pinion gears 32 of the input planetary gear set 30 that are rotatably mounted on the input carrier 34. The input carrier 34 is also coupled to a first clutch assembly 21 that selectively couples the input carrier 34 to a shaft 68. The shaft 68 couples the first clutch assembly 21 to an output ring gear 43. The output ring gear 43 is selectively coupled by a second clutch mechanism 22 through a shaft 66 to the transmission housing 17, thereby selectively preventing rotation of the output ring gear 43. The input pinion gears 32 are continuously meshed with an input sun gear 31 and input ring gear 33 of the input planetary gear set 30. The input sun gear 31 is coupled by a shaft 65 to a first electric motor 11 ("EMA 11"). The input ring gear 33 is coupled by an output carrier 44 of an output planetary gear set 40 to output pinion gears 42 of the output planetary gear set 40 that are rotatably mounted on the output carrier 44. The output sun gear 41 is coupled by a shaft 67 to a second electric motor 12 ("EMB 12"). The output carrier 44 is coupled to the output shaft 16. Alternatively, an input shaft 19 may be configured on the right side of the transmission as shown by the dashed line in FIG. 5. In one embodiment, the two motor electric drive hybrid transmission of FIG. 5 may be installed in a front wheel drive automobile because of the compact packaging of the two motor electric drive hybrid transmission.

Figure 6:
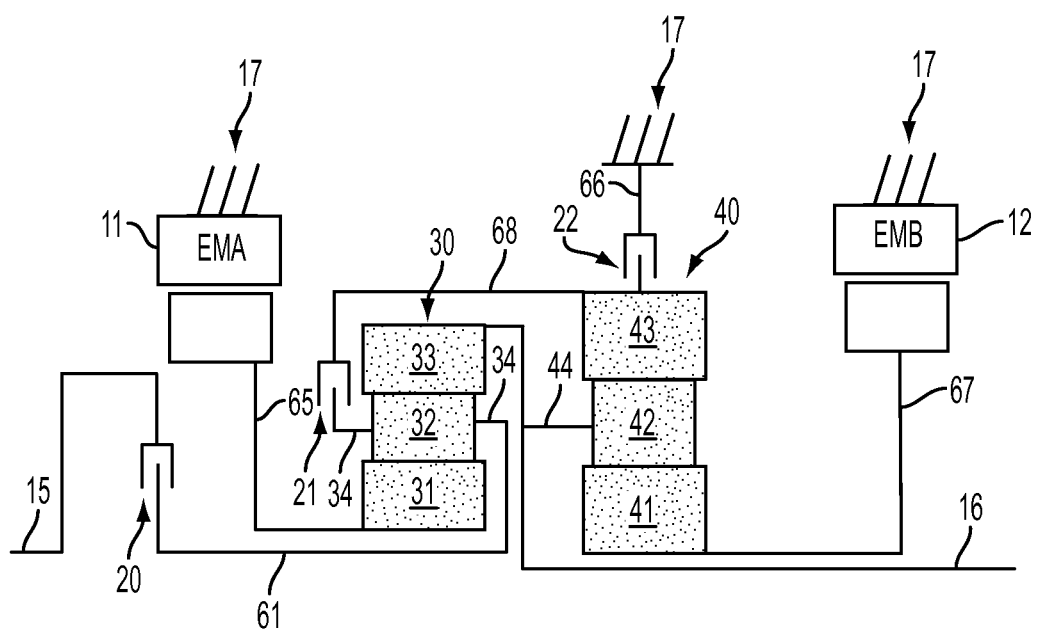
FIG. 6 is a schematic representation of yet another exemplary two motor electric drive hybrid transmission according to the principles of the present disclosure.

FIG. 6 illustrates an example schematic representation of another exemplary two motor electric drive hybrid transmission in accordance with a desired embodiment. The transmission includes an input shaft 15 coupled to a disconnect clutch assembly 20. The disconnect clutch assembly 20 selectively couples the input shaft 15 to a shaft 61. The shaft 61 couples the disconnect clutch assembly 20 to an input carrier 34 of an input planetary gear set 30 and, thereby, input pinion gears 32 of the input planetary gear set 30 that are rotatably mounted on the input carrier 34. The input pinion gears 32 are continuously meshed with an input sun gear 31 and an input ring gear 33 of the input planetary gear set 30. The input sun gear 31 is coupled by a shaft 65 to a first electric motor 11 ("EMA 11"). The input carrier 34 is also coupled to a first clutch assembly 21. The first clutch assembly 21 selectively couples the input carrier 34 to a shaft 68 coupled to an output ring gear 43 of an output planetary gear set 40. The output ring gear 43 is selectively coupled by a second clutch mechanism 22 through a shaft 66 to the transmission housing 17, thereby selectively preventing rotation of the output ring gear 43. The input ring gear 33 is coupled to an output carrier 44 of the output planetary gear set 40 and, thereby, output pinion gears 42 of the output planetary gear set 40 that are rotatably mounted on the output carrier 44. The output sun gear 41 is coupled by a shaft 67 to a second electric motor 12 ("EMB 12"). The output carrier 44 is coupled to the output shaft 16. In one embodiment, the two motor electric drive hybrid transmission of FIG. 6 may be installed in a rear wheel drive automobile because of the packaging arrangement of the two motor electric drive hybrid transmission.

Figure 7:
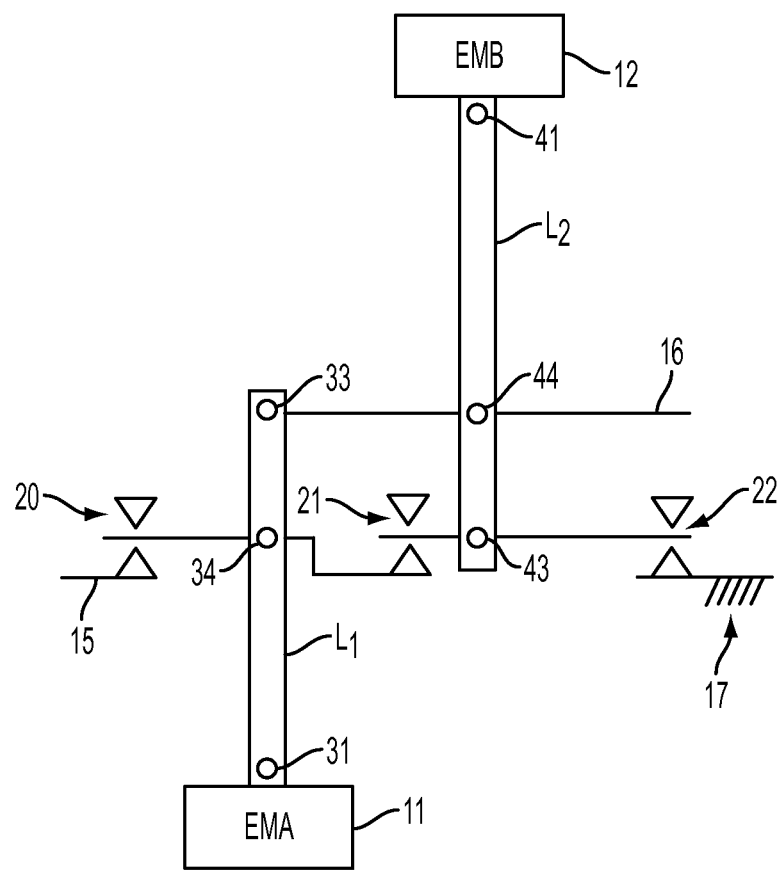
FIG. 7 is an exemplary lever diagram of the two motor electric drive hybrid transmissions of FIGS. 4-6.

FIG. 7 is an example lever diagram of the two motor electric drive hybrid transmission of FIGS. 4-6. The lever diagram shows exemplary gearing relationships between the components of the two motor electric drive hybrid transmission. The gearing relationship between the input sun gear 31, input carrier 34, and input ring gear 33 is shown on lever L1. The gearing relationship between the output ring gear 43, output carrier 44, and output sun gear 41 is shown on lever L2.

FIG. 8 is a table showing exemplary operating modes of the two motor electric drive hybrid transmission of FIGS. 4-6. The two motor electric drive hybrid transmission of FIGS. 4-6 may be operated with one electric motor providing propulsion in a low gear ratio (1 Motor E-Drive Low), with two electric motors providing propulsion in a low gear ratio (2 Motor E-Drive Low), with two electric motors providing propulsion in a high gear ratio (2 Motor E-Drive High), as an input split transmission (Input Split), or as a compound split transmission (Compound Split). The disconnect clutch assembly 20 (DC), first clutch assembly 21 (C1), and second clutch assembly 22 (C2) may be selectively activated to achieve the different operating states of the transmission. An "X" indicates that the clutch has been activated, thereby, coupling together all components to which it is attached. A blank indicates that the clutch has been deactivated, thereby, allowing the components to which it is coupled to rotate independently of one another.

With reference to FIGS. 4-8, when the two motor electric drive hybrid transmission is to be operated with one electric motor providing propulsion in a low gear ratio (1 Motor E-Drive Low), the second clutch assembly 22 is activated while the disconnect clutch assembly 20 and the first clutch assembly 21 are deactivated. Thus, the output ring gear 43 is coupled to the transmission housing 17 through the second clutch assembly 22 and shaft 66. Shaft 61 (FIGS. 4, 6) and the input carrier 34 are free to rotate independently of the input shaft 15. Likewise, the input carrier 34 is free to rotate independently of shaft 68 and the output ring gear 43. EMB 12 is powered as desired to generate propulsive force and cause the output shaft 16 to rotate. EMA 11 need not be powered and need not rotate.

To operate the two motor electric drive hybrid transmission with two electric motors providing propulsion in a low gear ratio (2 Motor E-Drive Low), the first and second clutch assemblies 21, 22 are activated while the disconnect clutch assembly 20 is deactivated. Thus, the input carrier 34 is coupled to the output ring gear 43 through shaft 68 and the first clutch assembly 21. The output ring gear 43 is coupled to the transmission housing 17 through the second clutch assembly 22 and shaft 66. Shaft 61 (FIGS. 4, 6) and the input carrier 34 are free to rotate independently of the input shaft 15. Both EMA 11 and EMB 12 are powered together as desired to generate propulsive force and cause the output shaft 16 to rotate.

To operate the two motor electric drive hybrid transmission with two electric motors providing propulsion in a high gear ratio (2 Motor E-Drive High), the first clutch assembly 21 is activated while the disconnect clutch assembly 20 and second clutch assembly 22 are deactivated. Thus, the input carrier 34 is coupled to the output ring gear 43 through shaft 68 and the first clutch assembly 21. Shaft 61 (FIGS. 4, 6) and the input carrier 34 are free to rotate independently of the input shaft 15. The output ring gear 43 is free to rotate. Both EMA 11 and EMB 12 are powered together as desired to generate propulsive force and cause the output shaft 16 to rotate.

To operate the two motor electric drive hybrid transmission as an input split transmission (Input Split), the disconnect clutch assembly 20 and second clutch assembly 22 are activated while the first clutch assembly 21 is deactivated. Thus, shaft 61 (FIGS. 4, 6) and the input carrier 34 are coupled to the input shaft 15. The output ring gear 43 is coupled to the transmission housing 17 through the second clutch assembly 22 and shaft 66. Shaft 68 and the output ring gear 43 are free to rotate independently of the input carrier 34. Propulsive power is provided by a combination of an engine coupled to the input shaft 15 and EMB 12. The engine may be any internal combustion engine or any other power source as desired. EMA 11 may be selectively used to generate electrical power while EMB 12 and the engine provide propulsive power. Alternatively, propulsion may be provided by a combination of the engine, EMA 11 and EMB 12.

To operate the two motor electric drive hybrid transmission as a compound split transmission (Compound Split), the disconnect clutch assembly 20 and first clutch assembly 21 are activated while the second clutch assembly 22 is deactivated. Thus, shaft 61 (FIGS. 4, 6) and the input carrier 34 are coupled to the input shaft 15. Moreover, the input carrier 34 is coupled to the output ring gear 43 through shaft 68 and the first clutch assembly 21. Propulsive power is provided by a combination of an engine coupled to the input shaft 15, EMA 11, and EMB 12. Both EMA 11 and EMB 12 may be powered together in addition to the engine to generate propulsive force and cause the output shaft 16 to rotate.

Figure 9:
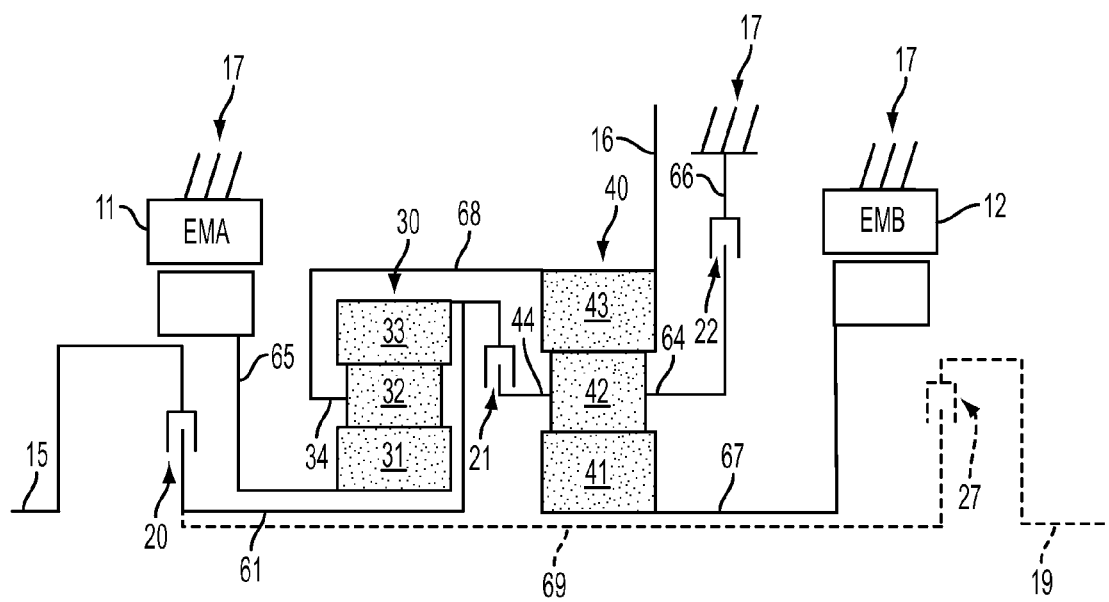
FIG. 9 is a schematic representation of another exemplary two motor electric drive hybrid transmission according to the principles of the present disclosure.

FIG. 9 illustrates an example schematic representation of another exemplary two motor electric drive hybrid transmission in accordance with a desired embodiment. The transmission includes an input shaft 15 coupled to a disconnect clutch assembly 20. The disconnect clutch assembly 20 selectively couples the input shaft 15 to a shaft 61. The shaft 61 couples the disconnect clutch assembly 20 to an input ring gear 33 of an input planetary gear set 30. The input ring gear 33 is continuously meshed with input pinion gears 32 of the input planetary gear set 30 that are rotatably mounted on an input carrier 34 of the input planetary gear set 30. The input carrier 34 is coupled by a shaft 68 to an output ring gear 43 of an output planetary gear set 40. The output ring gear 43 is coupled to the output shaft 16. The input pinion gears 32 are also continuously meshed with an input sun gear 31. The input sun gear 31 is coupled by a shaft 65 to a first electric motor 11 ("EMA 11"). The input ring gear 33 is also coupled to a first clutch assembly 21 that selectively couples the input ring gear 33 the an output carrier 44 of the output planetary gear set 40 and, thereby, output pinion gears 42 of the output planetary gear set 40 that are rotatably mounted on the output carrier 44. The output pinion gears 42 are coupled by a shaft 64 to a second clutch assembly 22. The second clutch assembly 22 selectively couples shaft 64 to a shaft 66 that is coupled to the transmission housing 17, thereby selectively preventing rotation of the output pinion gears 42. The output pinion gears 42 are also continuously meshed with the output ring gear 43 and an output sun gear 41 of the output planetary gear set 40. The output sun gear 41 is coupled by a shaft 67 to a second electric motor 12 ("EMB 12"). In one embodiment, the input shaft 15 and disconnect clutch assembly 20 may be configured on the left side of the transmission as shown by the solid line in FIG. 9. Alternatively, an input shaft 19 and a disconnect clutch assembly 27 may be configured on the right side of the transmission as shown by the dashed line in FIG. 9. The input shaft 19 and disconnect clutch assembly 27 are connected to shaft 61 by a shaft 69. In one embodiment, the two motor electric drive hybrid transmission of FIG. 9 may be installed in a front wheel drive automobile because of the compact packaging of the two motor electric drive hybrid transmission.

Figure 10:
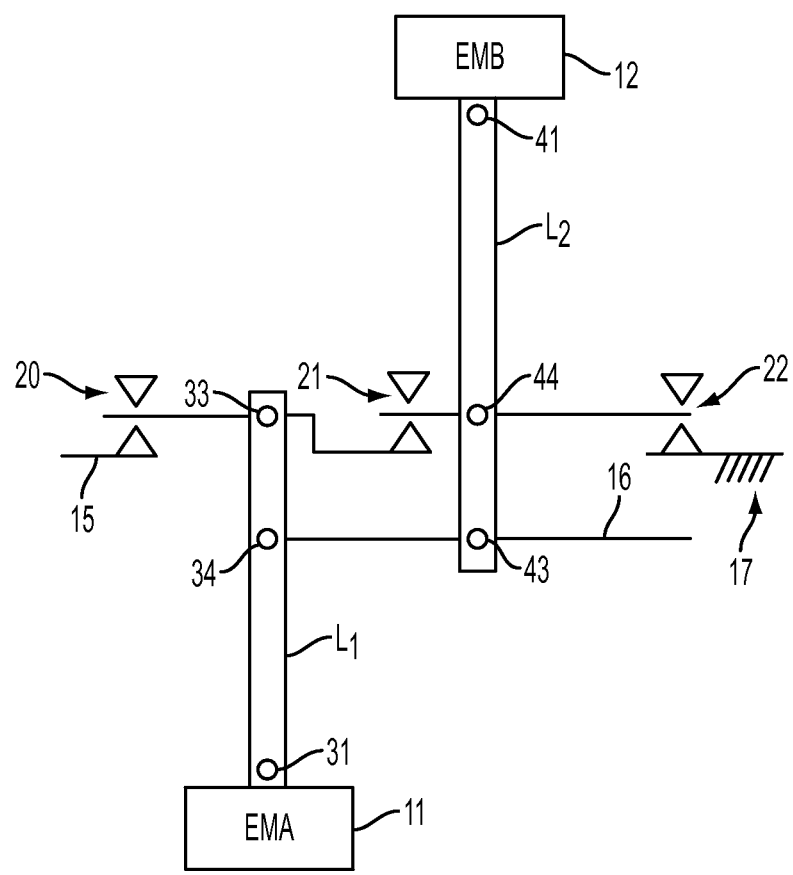
FIG. 10 is an exemplary lever diagram of the two motor electric drive hybrid transmission of FIG. 9.

FIG. 10 is an example lever diagram of the two motor electric drive hybrid transmission of FIG. 9. The lever diagram shows exemplary gearing relationships between the components of the two motor electric drive hybrid transmission. The gearing relationship between the input sun gear 31, input carrier 34, and input ring gear 33 is shown on lever L1. The gearing relationship between the output ring gear 43, output carrier 44, and output sun gear 41 is shown on lever L2.

FIG. 11 is a table showing exemplary operating modes of the two motor electric drive hybrid transmission of FIG. 9. The two motor electric drive hybrid transmission of FIG. 9 may be operated with one electric motor providing propulsion in a low gear ratio (1 Motor E-Drive Low), with two electric motors providing propulsion in a low gear ratio (2 Motor E-Drive Low), with two electric motors providing propulsion in a high gear ratio (2 Motor E-Drive High), as an input split transmission (Input Split), or as a compound split transmission (Compound Split). The disconnect clutch assembly 20 (or 27) (DC), first clutch assembly 21 (C1), and second clutch assembly 22 (C2) may be selectively activated to achieve the different operating states of the transmission. An "X" indicates that the clutch has been activated, thereby, coupling together all components to which it is attached. A blank indicates that the clutch has been deactivated, thereby, allowing the components to which it is coupled to rotate independently of one another.

With reference to FIGS. 9-11, when the two motor electric drive hybrid transmission is to be operated with one electric motor providing propulsion in a low gear ratio (1 Motor E-Drive Low), the second clutch assembly 22 is activated while the disconnect clutch assembly 20 (or 27) and the first clutch assembly 21 are deactivated. Thus, the output carrier 44 is coupled to the transmission housing 17 through the second clutch assembly 22 and shafts 64, 66. Shaft 61 (or 69) and the input ring gear 33 are free to rotate independently of the input shaft 15 (or 19). Likewise, the output carrier 44 is free to rotate independently of the input ring gear 33. EMB 12 is powered as desired to generate propulsive force and cause the output shaft 16 to rotate. EMA 11 need not be powered and need not rotate.

To operate the two motor electric drive hybrid transmission with two electric motors providing propulsion in a low gear ratio (2 Motor E-Drive Low), the first and second clutch assemblies 21, 22 are activated while the disconnect clutch assembly 20 (or 27) is deactivated. Thus, the input ring gear 33 is coupled to the output carrier 44 through the first clutch assembly 21. The output carrier 44 is coupled to the transmission housing 17 through the second clutch assembly 22 and shafts 64, 66. Shaft 61 (or 69) and the input ring gear 33 are free to rotate independently of the input shaft 15 (or 19). Both EMA 11 and EMB 12 are powered together as desired to generate propulsive force and cause the output shaft 16 to rotate.

To operate the two motor electric drive hybrid transmission with two electric motors providing propulsion in a high gear ratio (2 Motor E-Drive High), the first clutch assembly 21 is activated while the disconnect clutch assembly 20 (or 27) and second clutch assembly 22 are deactivated. Thus, the input ring gear 33 is coupled to the output carrier 44 through the first clutch assembly 21. Shaft 61 (or 69) and the input ring gear 33 are free to rotate independently of the input shaft 15 (or 19). The output carrier 44 is free to rotate. Both EMA 11 and EMB 12 are powered together as desired to generate propulsive force and cause the output shaft 16 to rotate.

To operate the two motor electric drive hybrid transmission as an input split transmission (Input Split), the disconnect clutch assembly 20 (or 27) and second clutch assembly 22 are activated while the first clutch assembly 21 is deactivated. Thus, shaft 61 (or 69) and the input ring gear 33 are coupled to the input shaft 15 (or 19) through the disconnect clutch 20 (or 27). The output carrier 44 is coupled to the transmission housing 17 through the second clutch assembly 22 and shafts 64, 66. The output carrier 44 is free to rotate independently of the input ring gear 33. Propulsive power is provided by a combination of an engine coupled to the input shaft 15 (or 19) and EMB 12. The engine may be any internal combustion engine or any other power source as desired. EMA 11 may be selectively used to generate electrical power while EMB 12 and the engine provide propulsive power. Alternatively, propulsion may be provided by a combination of the engine, EMA 11 and EMB 12.

To operate the two motor electric drive hybrid transmission as a compound split transmission (Compound Split), the disconnect clutch assembly 20 (or 27) and first clutch assembly 21 are activated while the second clutch assembly 22 is deactivated. Thus, shaft 61 (or 69) and the input ring gear 33 are coupled to the input shaft 15 through the disconnect clutch assembly 20 (or 27). The input ring gear 33 is coupled to the output carrier 44 through the first clutch assembly 21. The output carrier 44 is free to rotate relative to the transmission housing 17. Propulsive power is provided by a combination of an engine coupled to the input shaft 15 (or 19), EMA 11, and EMB 12. Both EMA 11 and EMB 12 may be powered together in addition to the engine to generate propulsive force and cause the output shaft 16 to rotate.

Figure 12:
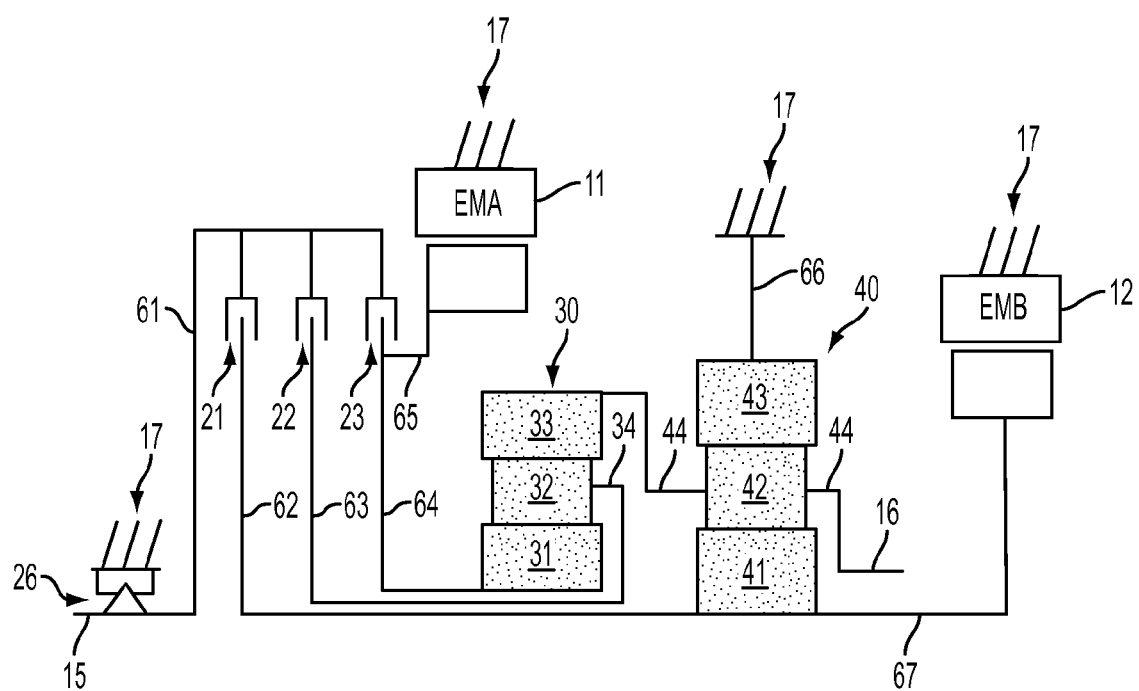
FIG. 12 is a schematic representation of another exemplary two motor electric drive hybrid transmission according to the principles of the present disclosure.

FIG. 12 illustrates an example schematic representation of another exemplary two motor electric drive hybrid transmission in accordance with a desired embodiment. The transmission includes an input shaft 15 coupled to a one way clutch assembly 26. The one way clutch assembly 26 is coupled to the transmission housing 17 and permits rotation of the input shaft 15 only in one direction. For example, the one way clutch assembly 26 may permit rotation of the input shaft 15 in a clockwise direction, but not in a counterclockwise direction. Alternatively, the one way clutch assembly 26 may permit rotation of the input shaft 15 in a counterclockwise direction, but not in a clockwise direction. The input shaft 15 is coupled to a first clutch assembly 21, second clutch assembly 22, and a third clutch assembly 23 by a shaft 61. The first clutch assembly 21 selectively couples shaft 61 to a shaft 62 coupled to an output sun gear 41 of an output planetary gear set 40. The second clutch assembly 22 selectively couples shaft 61 to a shaft 63 coupled an input carrier 34 of the input planetary gear set 30. Input pinion gears 32 of the input planetary gear set 30 are rotatably mounted on the input carrier 34. The third clutch assembly 23 selectively couples shaft 61 to a shaft 64 coupled to an input sun gear 31 of the input planetary gear set 30. The shaft 64 is also coupled to a shaft 65 coupled to a first electric motor 11 ("EMA 11"). The input pinion gears 32 are continuously meshed with the input sun gear 31 and an input ring gear 33 of the input planetary gear set 30. The input ring gear 33 is coupled to a carrier 44 of the output planetary gear set 40 and, thereby, output pinion gears 42 of the output planetary gear set 40 that are rotatably mounted on the output carrier 44. The output pinion gears 42 are continuously meshed with an output ring gear 43 of the output planetary gear set 40 and the output sun gear 41. The output ring gear 43 is coupled by a shaft 66 to the transmission housing 17, thereby preventing rotation of the output ring gear 43. The output sun gear 41 is coupled by a shaft 67 to a second electric motor 12 ("EMB 12"). The output carrier 44 is coupled to an output shaft 16.

Figure 13:
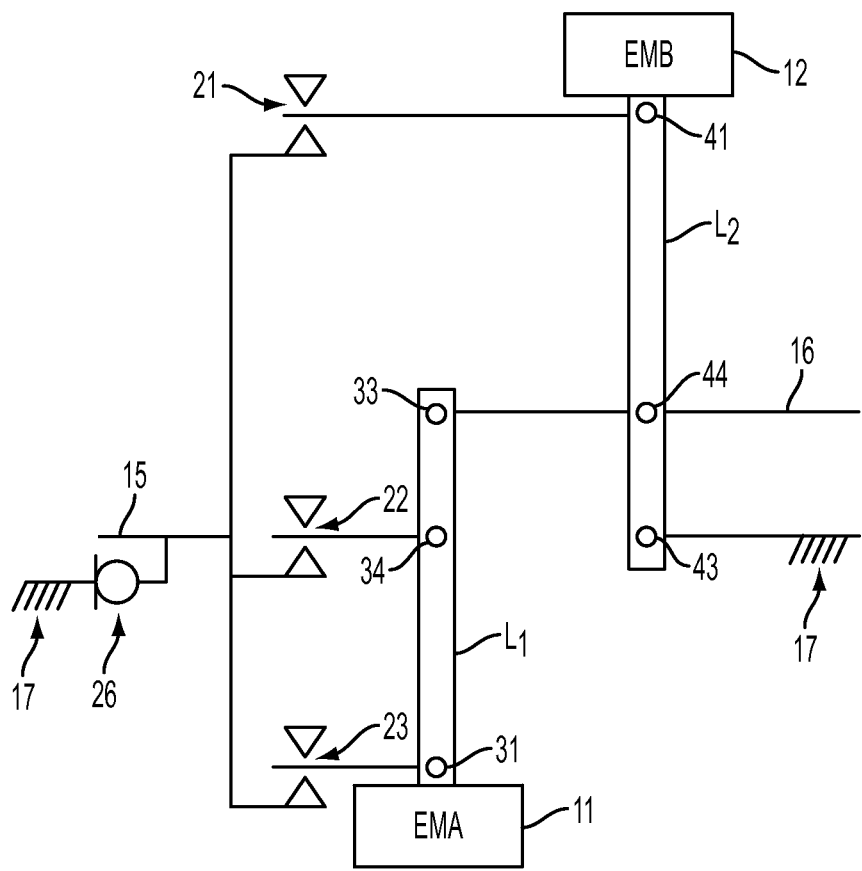
FIG. 13 is an exemplary lever diagram of the two motor electric drive hybrid transmission of FIG. 12.

FIG. 13 is an example lever diagram of the two motor electric drive hybrid transmission of FIG. 12. The lever diagram shows exemplary gearing relationships between the components of the two motor electric drive hybrid transmission. The gearing relationship between the input sun gear 31, input carrier 34, and input ring gear 33 is shown on lever L1. The gearing relationship between the output ring gear 43, output carrier 44, and output sun gear 41 is shown on lever L2.

FIG. 14 is a table showing exemplary operating modes of the two motor electric drive hybrid transmission of FIG. 12. The two motor electric drive hybrid transmission of FIG. 12 may be operated with EMB 12 providing propulsion (1 Motor E-Drive EMB), with EMA 11 and EMB 12 providing propulsion (2 Motor E-Drive), as a series hybrid transmission (Series), as an input split hybrid transmission (Input Split), in a first gear ratio with EMA 11 geared relative to EMB 12 and the engine (1st Gear with A geared relative to Engine and B), in the first gear with EMA 11, EMB 12, and the engine providing propulsion (1st gear with A and B), in the first gear with EMB 12 and the engine providing propulsion (1st Gear with B only), and in a 3rd Gear with any combination of EMA 11, EMB 12 and the engine providing propulsive power (3rd Gear). The first clutch assembly 21 (C1), second clutch assembly 22 (C2), and third clutch assembly 23 (C3) may be selectively activated to achieve the different operating states of the transmission. An "X" indicates that the clutch has been activated, thereby, coupling together all components to which it is attached. A blank indicates that the clutch has been deactivated, thereby, allowing the components to which it is coupled to rotate independently of one another. The two motor electric drive hybrid transmission is capable of achieving propulsion without any hydraulic pressure when operating in an electric operation mode. Thus, the two motor electric drive hybrid transmission can provide vehicle propulsion immediately upon startup without needing to wait for hydraulic pressure to build.

With reference to FIGS. 12-14, when the two motor electric drive hybrid transmission is to be operated with EMB 12 providing propulsion (1 Motor E-Drive EMB), the first, second, and third clutch assemblies 21, 22, 23 are deactivated. Thus, the output sun gear 41 coupled by shaft 62 to the first clutch assembly 21, the input carrier 34 coupled by shaft 63 to the second clutch assembly 22, the input sun gear 31 coupled by shaft 64 to the third clutch assembly 23, and EMA 11 coupled by shafts 64, 65 to the third clutch assembly 23, are all free to rotate with respect to shaft 61. EMB 12 is powered as desired to generate propulsive force and cause the output shaft 16 to rotate.

To operate the two motor electric drive hybrid transmission with EMA 11 and EMB 12 providing propulsion (2 Motor E-Drive), the second clutch assembly 22 is activated while the first and third clutch assemblies 21, 23 are deactivated. Thus, the input carrier 34 is coupled to shaft 61 though shaft 63 and the second clutch assembly 22. The output sun gear 41 coupled by shaft 62 to the first clutch assembly 21, the input sun gear 31 coupled by shaft 64 to the third clutch assembly 23, and EMA 11 coupled by shafts 64, 65 to the third clutch assembly 23, are all free to rotate with respect to shaft 61. EMA 11 and EMB 12 are powered as desired. The one way clutch 26 (OWC) prevents the input shaft 15 from rotating in a first direction. Thus, propulsive force from EMA 11 and EMB 12 causes the output shaft 16 to rotate.

To operate the two motor electric drive hybrid transmission as a series hybrid transmission (Series), the third clutch assembly 23 is activated while the first and second clutch assemblies 21, 22 are deactivated. Thus, the input sun gear 31 is coupled to shaft 61 through shaft 64 and the third clutch assembly 23 and EMA 11 is coupled to shaft 61 through shafts 64, 65 and the third clutch assembly 23. The output sun gear 41 coupled by shaft 62 to the first clutch assembly 21, and the input carrier 34 coupled by shaft 63 to the second clutch assembly 22, are all free to rotate with respect to shaft 61. Power is provided by an engine coupled to the input shaft 15. The engine may be any internal combustion engine or any other power source as desired. Power from the engine causes EMA 11 to rotate and generate electrical power. The electrical power generated by EMA 11 is used to power EMB 12. EMB 12 provides the propulsive force to rotate output shaft 16.

To operate the two motor electric drive hybrid transmission as an input split hybrid transmission (Input Split), the second clutch assembly 22 is activated while the first and third clutch assemblies 21, 23 are deactivated. Thus, the input carrier 34 is coupled to shaft 61 through shaft 63 and the second clutch assembly 22. The output sun gear 41 coupled by shaft 62 to the first clutch assembly 21, the input sun gear 31 coupled by shaft 64 to the third clutch assembly 23, and EMA 11 coupled by shafts 64, 65 to the third clutch assembly 23, are all free to rotate with respect to shaft 61. Propulsive power is provided by a combination of an engine coupled to the input shaft 15 and EMB 12. EMA 11 may be selectively used to generate electrical power while EMB 12 and the engine provide propulsive power. Alternatively, propulsion may be provided by a combination of the engine, EMA 11 and EMB 12.

To operate the two motor electric drive hybrid transmission in a first gear ratio with EMA 11 geared relative to EMB 12 and the engine (1st Gear with A geared relative to Engine and B), the first and second clutch assemblies 21, 22 are activated while the third clutch assembly 23 is deactivated. Thus, the output sun gear 41 is coupled to shaft 61 through shaft 62 and the first clutch assembly 21, and the input carrier 34 is coupled to shaft 61 through shaft 63 and the second clutch assembly 22. The input sun gear 31 coupled by shaft 64 to the third clutch assembly 23, and EMA 11 coupled by shafts 64, 65 to the third clutch assembly 23, are all free to rotate with respect to shaft 61. Propulsive power is provided by a combination of an engine coupled to the input shaft 15, EMA, 11, and EMB 12.

To operate the two motor electric drive hybrid transmission in the first gear with EMA 11, EMB 12, and the engine providing propulsion (1st gear with A and B), the first and third clutch assemblies 21, 23 are activated while the second clutch assembly 22 is deactivated. Thus, the output sun gear 41 is coupled to shaft 61 through shaft 62 and the first clutch assembly 21, the input sun gear 31 is coupled to shaft 61 through shaft 64 and the third clutch assembly 23, and EMA 11 is coupled to shaft 61 through shafts 64, 65 and the third clutch assembly 23. The input carrier 34 coupled by shaft 63 to the second dutch assembly 22 is free to rotate with respect to shaft 61. Propulsive power is provided by a combination of an engine coupled to the input shaft 15, EMA, 11, and EMB 12.

To operate the two motor electric drive hybrid transmission in the first gear with EMB 12 and the engine providing propulsion (1st Gear with B only), the first clutch assembly 21 is activated while the second and third clutch assemblies 22, 23 are deactivated. Thus, the output sun gear 41 is coupled to shaft 61 through shaft 62 and the first clutch assembly 21. The input carrier 34 coupled by shaft 63 to the second clutch assembly 22, the input sun gear 31 coupled by shaft 64 to the third clutch assembly 23, and EMA 11 coupled by shafts 64, 65 to the third clutch assembly 23, are all free to rotate with respect to shaft 61. Propulsive power is provided by a combination of an engine coupled to the input shaft 15 and EMB 12.

To operate the two motor electric drive hybrid transmission in a 3rd Gear with any combination of EMA 11, EMB 12 and the engine providing propulsive power (3rd Gear), the second and third clutch assembly 22, 23 are activated while the first clutch assembly 21 is deactivated. Thus, the input carrier 34 is coupled to shaft 61 through shaft 63 and the second clutch assembly 22, the input sun gear 31 is coupled to shaft 61 through shaft 64 and the third clutch assembly 23, and EMA 11 is coupled to shaft 61 through shafts 64, 65 and the third clutch assembly 23. Moreover, the output sun gear 41 coupled by shaft 62 to the first clutch assembly 21 is free to rotate with respect to shaft 61. Propulsive power is provided by a combination of an engine coupled to the input shaft 15, EMA 11, and EMB 12.

Figure 15:
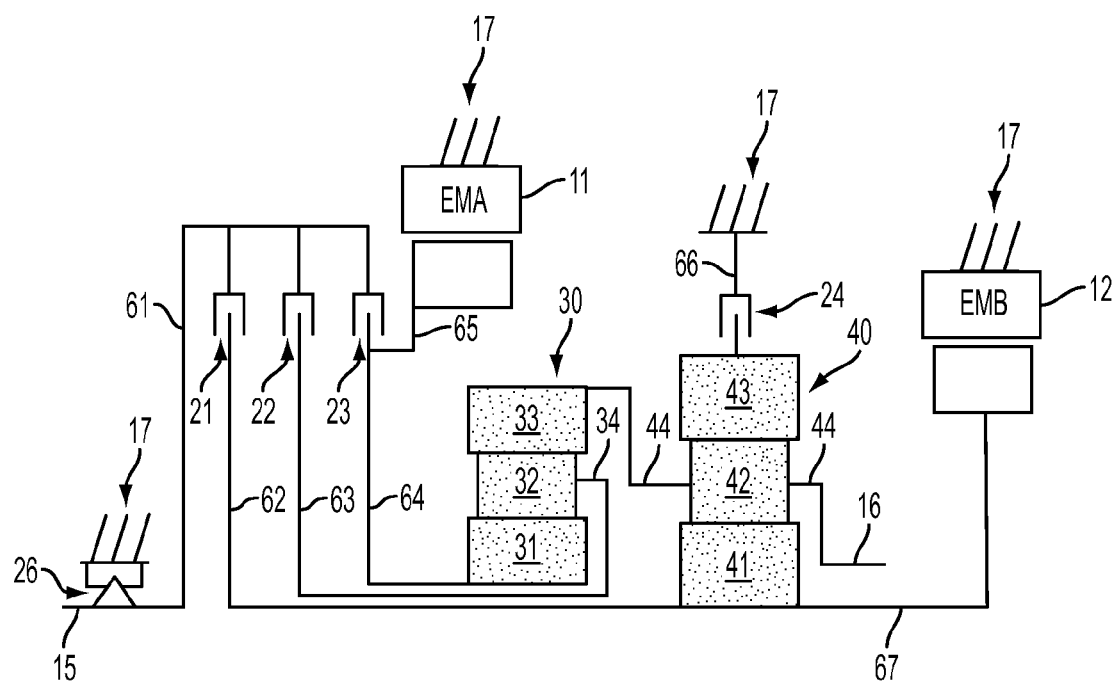
FIG. 15 is a schematic representation of another exemplary two motor electric drive hybrid transmission according to the principles of the present disclosure.

FIG. 15 illustrates an example schematic representation of another exemplary two motor electric drive hybrid transmission in accordance with a desired embodiment. The transmission includes an input shaft 15 coupled to a one way clutch assembly 26. The one way clutch assembly 26 is coupled to the transmission housing 17 and permits rotation of the input shaft 15 only in one direction. For example, the one way clutch assembly 26 may permit rotation of the input shaft 15 in a clockwise direction, but not in a counterclockwise direction. Alternatively, the one way clutch assembly 26 may permit rotation of the input shaft 15 in a counterclockwise direction, but not in a clockwise direction. The input shaft 15 is coupled to a first clutch assembly 21, second clutch assembly 22, and a third clutch assembly 23 by a shaft 61. The first clutch assembly 21 selectively couples shaft 61 to a shaft 62 coupled to an output sun gear 41 of an output planetary gear set 40. The second clutch assembly 22 selectively couples shaft 61 to a shaft 63 coupled an input carrier 34 of an input planetary gear set 30. Input pinion gears 32 of the input planetary gear set 30 are rotatably mounted on the input carrier 34. The third clutch assembly 23 selectively couples shaft 61 to a shaft 64 coupled to an input sun gear 31 of the input planetary gear set 30. The shaft 64 is also coupled by a shaft 65 to a first electric motor 11 ("EMA 11"). The input pinion gears 32 are continuously meshed with the input sun gear 31 and an input ring gear 33 of the input planetary gear set 30. The input ring gear 33 is coupled to an output carrier 44 of the output planetary gear set 40 and, thereby, output pinion gears 42 of the output planetary gear set 40 that are rotatably mounted on the output carrier 44. The output pinion gears 42 are continuously meshed with an output ring gear 43 of the output planetary gear set 40 and the output sun gear 41. The output ring gear 43 is selectively coupled to a fourth clutch assembly 24 that is coupled by a shaft 66 to the transmission housing 17, thereby, selectively preventing rotation of the output ring gear 43. The output sun gear 41 is coupled by a shaft 67 to a second electric motor 12 ("EMB 12"). The output carrier 44 is coupled to an output shaft 16.

Figure 16:
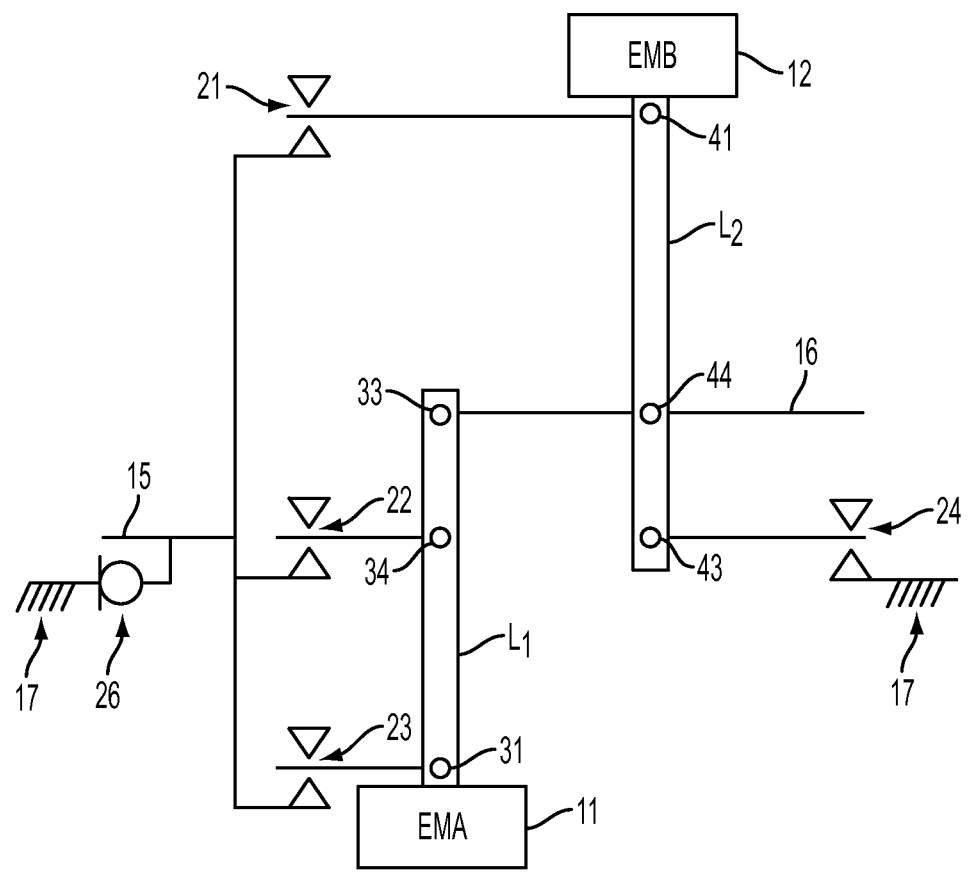
FIG. 16 is an exemplary lever diagram of the two motor electric drive hybrid transmission of FIG. 15.

FIG. 16 is an example lever diagram of the two motor electric drive hybrid transmission of FIG. 15. The lever diagram shows exemplary gearing relationships between the components of the two motor electric drive hybrid transmission. The gearing relationship between the input sun gear 31, input carrier 34, and input ring gear 33 is shown on lever L1. The gearing relationship between the output ring gear 43, output carrier 44, and output sun gear 41 is shown on lever L2.

FIG. 17 is a table showing exemplary operating modes of the two motor electric drive hybrid transmission of FIG. 15. The two motor electric drive hybrid transmission of FIG. 15 may be operated with one electric motor providing propulsion (1 Motor E-Drive), with two electric motors providing propulsion (2 Motor E-Drive), as a series hybrid transmission (Series), as an input split hybrid transmission (Input Split), in a first gear ratio with EMA 11 geared relative to EMB 12 and the engine (1st Gear with A geared relative to Engine and B), in the first gear with EMA 11, EMB 12, and the engine providing propulsion (1st gear with A and B), in the first gear with EMB 12 and the engine providing propulsion (1st Gear with B only), in a 3rd Gear with EMA 11, EMB 12 and the engine providing propulsive power (3rd Gear with A and B), and in a 3rd Gear with EMA 11 and the engine providing propulsive power (3rd Gear with A). The first clutch assembly 21 (C1), second clutch assembly 22 (C2), third clutch assembly 23 (C3), and fourth clutch assembly 24 (C4) may be selectively activated to achieve the different operating states of the transmission. An "X" indicates that the clutch has been activated, thereby, coupling together all components to which it is attached. A blank indicates that the clutch has been deactivated, thereby, allowing the components to which it is coupled to rotate independently of one another.

With reference to FIGS. 15-17, when the two motor electric drive hybrid transmission is to be operated with EMA 11 providing propulsion (1 Motor E-Drive EMA), the second and fourth clutch assemblies 22, 24 are activated while the first and third clutch assemblies 21, 23 are deactivated. Thus, the input carrier 34 coupled by shaft 63 to the second clutch assembly 22 is coupled to shaft 61, and the output ring gear 43 is coupled to the transmission housing 17 by shaft 66 and the fourth clutch assembly 24. The output sun gear 41 coupled by shaft 62 to the first clutch assembly 21, the input sun gear 31 coupled by shaft 64 to the third clutch assembly 23, and EMA 11 coupled by shafts 64, 65 to the third clutch assembly 23, are all free to rotate with respect to shaft 61. EMA 11 or EMB 12 may be powered as desired to generate propulsive force and cause the output shaft 16 to rotate.

To operate the two motor electric drive hybrid transmission with EMA 11 and EMB 12 providing propulsion (2 Motor E-Drive), the second and fourth clutch assemblies 22, 24 are activated while the first and third clutch assemblies 21, 23 are deactivated. Thus, the input carrier 34 is coupled to shaft 61 though shaft 63 and the second clutch assembly 22, and the output ring gear 43 is coupled to the transmission housing 17 by shaft 66 and the fourth clutch assembly 24. The output sun gear 41 coupled by shaft 62 to the first clutch assembly 21, the input sun gear 31 coupled by shaft 64 to the third clutch assembly 23, and EMA 11 coupled by shafts 64, 65 to the third clutch assembly 23, are all free to rotate with respect to shaft 61. EMA 11 and EMB 12 are powered as desired. The one way clutch 26 (OWC) prevents the input shaft 15 from rotating in a first direction. Thus, propulsive force from EMA 11 and EMB 12 causes the output shaft 16 to rotate.

To operate the two motor electric drive hybrid transmission as a series hybrid transmission (Series), the third and fourth clutch assemblies 23, 24 are activated while the first and second clutch assemblies 21, 22 are deactivated. Thus, the input sun gear 31 is coupled to shaft 61 through shaft 64 and the third clutch assembly 23, EMA 11 is coupled to shaft 61 through shafts 64, 65 and the third clutch assembly 23, and the output ring gear 43 is coupled to the transmission housing 17 by shaft 66 and the fourth clutch assembly 24. The output sun gear 41 coupled by shaft 62 to the first clutch assembly 21, and the input carrier 34 coupled by shaft 63 to the second clutch assembly 22, are all free to rotate with respect to shaft 61. Power is provided by an engine coupled to the input shaft 15. The engine may be any internal combustion engine or any other power source as desired. Power from the engine causes EMA 11 to rotate and generate electrical power. The electrical power generated by EMA 11 is used to power EMB 12. EMB 12 provides the propulsive force to rotate output shaft 16.

To operate the two motor electric drive hybrid transmission as an input split hybrid transmission (Input Split), the second and fourth clutch assemblies 22, 24 are activated while the first and third clutch assemblies 21, 23 are deactivated. Thus, the input carrier 34 is coupled to shaft 61 through shaft 63 and the second clutch assembly 22, and the output ring gear 43 is coupled to the transmission housing 17 by shaft 66 and the fourth clutch assembly 24. The output sun gear 41 coupled by shaft 62 to the first clutch assembly 21, the input sun gear 31 coupled by shaft 64 to the third clutch assembly 23, and EMA 11 coupled by shafts 64, 65 to the third clutch assembly 23, are all free to rotate with respect to shaft 61. Propulsive power is provided by a combination of an engine coupled to the input shaft 15 and EMB 12. EMA 11 may be selectively used to generate electrical power while EMB 12 and the engine provide propulsive power. Alternatively, propulsion may be provided by a combination of the engine, EMA 11 and EMB 12.

To operate the two motor electric drive hybrid transmission in a first gear ratio with EMA 11 geared relative to EMB 12 and the engine (1st Gear with A geared relative to Engine and B), the first, second, and fourth clutch assemblies 21, 22, 24 are activated while the third clutch assembly 23 is deactivated. Thus, the output sun gear 41 is coupled to shaft 61 through shaft 62 and the first clutch assembly 21, the input carrier 34 is coupled to shaft 61 through shaft 63 and the second clutch assembly 22, and the output ring gear 43 is coupled to the transmission housing 17 by shaft 66 and the fourth clutch assembly 24. The input sun gear 31 coupled by shaft 64 to the third clutch assembly 23, and EMA 11 coupled by shafts 64, 65 to the third clutch assembly 23, are all free to rotate with respect to shaft 61. Propulsive power is provided by a combination of an engine coupled to the input shaft 15, EMA, 11, and EMB 12.

To operate the two motor electric drive hybrid transmission in the first gear with EMA 11, EMB 12, and the engine providing propulsion (1st gear with A and B), the first, third, and fourth clutch assemblies 21, 23, 24 are activated while the second clutch assembly 22 is deactivated. Thus, the output sun gear 41 is coupled to shaft 61 through shaft 62 and the first clutch assembly 21, the input sun gear 31 is coupled to shaft 61 through shaft 64 and the third clutch assembly 23, EMA 11 is coupled to shaft 61 through shafts 64, 65 and the third clutch assembly 23, and the output ring gear 43 is coupled to the transmission housing 17 by shaft 66 and the fourth clutch assembly 24. The input carrier 34 coupled by shaft 63 to the second clutch assembly 22 is free to rotate with respect to shaft 61. Propulsive power is provided by a combination of an engine coupled to the input shaft 15, EMA 11, and EMB 12.

To operate the two motor electric drive hybrid transmission in the first gear with EMB 12 and the engine providing propulsion (1st Gear with B only), the first and fourth clutch assemblies 21, 24 are activated while the second and third clutch assemblies 22, 23 are deactivated. Thus, the output sun gear 41 is coupled to shaft 61 through shaft 62 and the first clutch assembly 21, and the output ring gear 43 is coupled to the transmission housing 17 by shaft 66 and the fourth clutch assembly 24. The input carrier 34 coupled by shaft 63 to the second clutch assembly 22, the input sun gear 31 coupled by shaft 64 to the third clutch assembly 23, and EMA 11 coupled by shafts 64, 65 to the third clutch assembly 23, are all free to rotate with respect to shaft 61. Propulsive power is provided by a combination of an engine coupled to the input shaft 15 and EMB 12.

To operate the two motor electric drive hybrid transmission in a 3rd Gear with EMA 11, EMB 12, and the engine providing propulsion power (3rd Gear with A and B), the first, second, and third clutch assemblies 21, 22, 23 are activated while the fourth clutch assembly 24 is deactivated. Thus, the output sun gear 41 is coupled to shaft 61 through shaft 62 and the first clutch assembly 21, the input carrier 34 is coupled to shaft 61 through shaft 63 and the second clutch assembly 22, the input sun gear 31 is coupled to shaft 61 through shaft 64 and the third clutch assembly 23, and EMA 11 is coupled to shaft 61 through shafts 64, 65 and the third clutch assembly 23. The output ring gear 43 is free to rotate with respect to shaft 66 and the transmission housing 17. Propulsive power is provided by a combination of an engine coupled to the input shaft 15, EMA 11, and EMB 12.

To operate the two motor electric drive hybrid transmission in a 3rd Gear with EMA 11 and the engine providing propulsive power (3rd Gear with A only), the second and third clutch assemblies 22, 23 are activated while the first and fourth clutch assemblies 21, 24 are deactivated. Thus, the input carrier 34 is coupled to shaft 61 through shaft 63 and the second clutch assembly 22, the input sun gear 31 is coupled to shaft 61 through shaft 64 and the third clutch assembly 23, and EMA 11 is coupled to shaft 61 through shafts 64, 65 and the third clutch assembly 23. The output sun gear 41 coupled by shaft 62 to the first clutch assembly 21 is free to rotate with respect to shaft 61, and the output ring gear 43 is free to rotate with respect to shaft 66 and the transmission housing 17. Propulsive power is provided by a combination of an engine coupled to the input shaft 15 and EMA 11.

Figure 18:
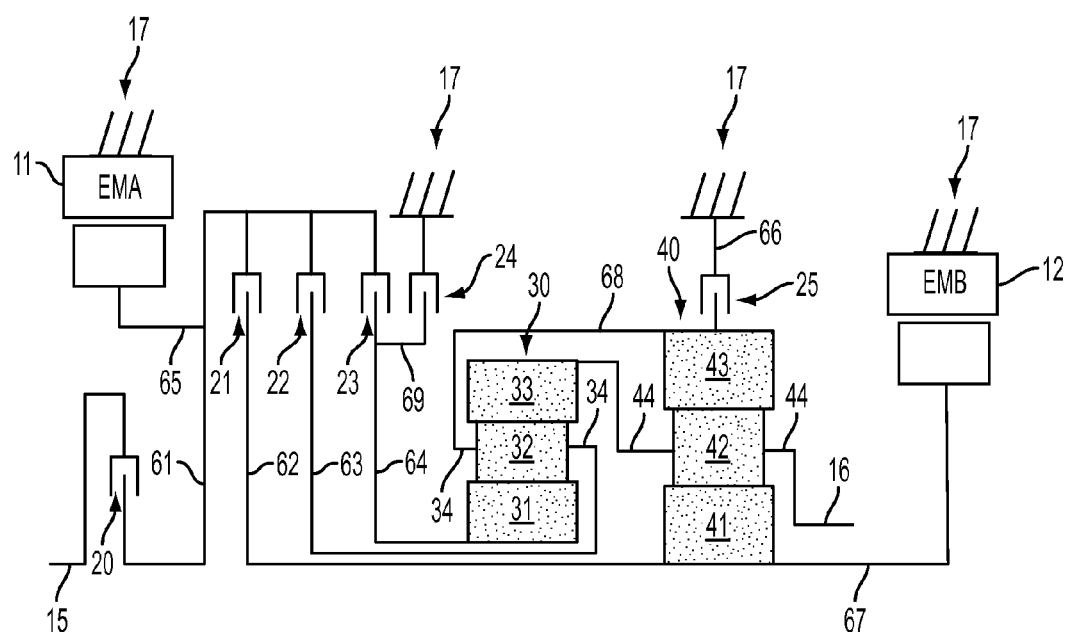
FIG. 18 is a schematic representation of another exemplary two motor electric drive hybrid transmission according to the principles of the present disclosure.

FIG. 18 illustrates an example schematic representation of another exemplary two motor electric drive hybrid transmission in accordance with a desired embodiment. The transmission includes an input shaft 15 coupled to a disconnect clutch assembly 20. The disconnect clutch assembly 20 selectively couples the input shaft 15 to a shaft 61 coupled to a first clutch assembly 21, second clutch assembly 22, and a third clutch assembly 23. Shaft 61 is also coupled to a shaft 65 coupled to a first electric motor 11 ("EMA 11"). The first clutch assembly 21 selectively couples shaft 61 to a shaft 62 coupled to an output sun gear 41 of an output planetary gear set 40. In one embodiment, the first clutch assembly 21 may be constantly locked, thereby, constantly coupling shaft 61 to shaft 62. In one embodiment, the first clutch assembly 21 may be omitted entirely and shaft 61 may be directly coupled to shaft 62 or shaft 61 may be directly coupled to the output sun gear 41. The second clutch assembly 22 selectively couples shaft 61 to a shaft 63 coupled an input carrier 34 of an input planetary gear set 30. Shaft 63 is also coupled to a shaft 69 coupled to a fourth clutch assembly 24. The fourth clutch assembly 24 selectively couples shaft 69 and, thereby shaft 64 and the fourth clutch assembly 24 to the transmission housing 17. In one embodiment, the fourth clutch assembly 24 and shaft 69 may be omitted. Input pinion gears 32 of the input planetary gear set 30 are rotatably mounted on the input carrier 34. The third clutch assembly 23 selectively couples shaft 61 to a shaft 64 coupled to an input sun gear 31 of the input planetary gear set 30. The input pinion gears 32 are continuously meshed with the input sun gear 31 and an input ring gear 33 of the input planetary gear set 30. The input ring gear 33 is coupled to a carrier 44 of the output planetary gear set 40 and, thereby, output pinion gears 42 of the output planetary gear set 40 that are rotatably mounted on the output carrier 44. The output pinion gears 42 are continuously meshed with an output ring gear 43 of the output planetary gear set 40 and the output sun gear 41. The input carrier 34 is coupled by a shaft 68 to the output ring gear 43. The output ring gear 43 is selectively coupled to a fifth clutch assembly 25 that is coupled by a shaft 66 to the transmission housing 17, thereby, selectively preventing rotation of the output ring gear 43. The output sun gear 41 is coupled by a shaft 67 to a second electric motor 12 ("EMB 12"). The output carrier 44 is coupled to an output shaft 16.

Figure 19:
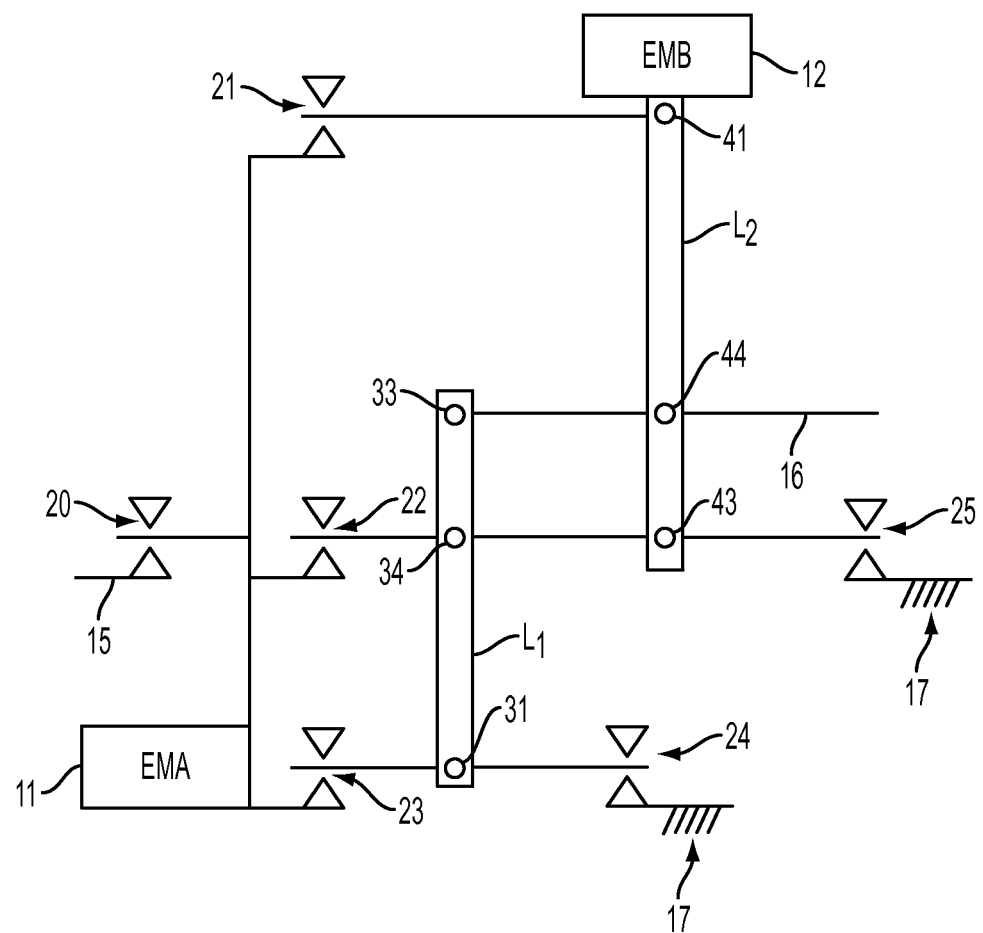
FIG. 19 is an exemplary lever diagram of the two motor electric drive hybrid transmission of FIG. 18.

FIG. 19 is an example lever diagram of the two motor electric drive hybrid transmission of FIG. 18. The lever diagram shows exemplary gearing relationships between the components of the two motor electric drive hybrid transmission. The gearing relationship between the input sun gear 31, input carrier 34, and input ring gear 33 is shown on lever L1.

The gearing relationship between the output ring gear 43, output carrier 44, and output sun gear 41 is shown on lever L2.

FIG. 20 is a table showing exemplary operating modes of the two motor electric drive hybrid transmission of FIG. 18. The two motor electric drive hybrid transmission of FIG. 18 may be operated with one electric motor providing propulsion in a low range (1 Motor EV Mode Low Range), with one electric motor providing propulsion in a high range (1 Motor EV Mode High Range), as a series hybrid transmission in a low range (Series Mode Low Range), as a series hybrid transmission in a high range (Series Mode High Range), with two electric motors providing propulsion in reverse (2 Motor EV Drive—Rev), with two electric motors providing propulsion in a first gear ratio (2 Motor EV Drive—1st Gear), with two electric motors providing propulsion in a second gear ratio (2 Motor EV Drive—2nd Gear), with two electric motors providing propulsion in a third gear ratio (2 Motor EV Drive—3rd Gear), with two electric motors providing propulsion in an alternate arrangement third gear ratio (2 Motor EV Drive—3rd Gear Alt), with two electric motors providing propulsion in a fourth gear ratio (2 Motor EV Drive—4th Gear), with two electric motors providing propulsion in a low range (2 Motor EV Drive—Low Range), with two electric motors providing propulsion in a medium range (2 Motor EV Drive—Med Range), with engine and optional electric motor propulsion in reverse (Engine Drive—Rev), with engine and optional electric motor propulsion in a first gear ratio (Engine Drive—1st Gear), with engine and optional electric motor propulsion in a second gear ratio (Engine Drive—2nd Gear), with engine and optional electric motor propulsion in a third gear ratio (Engine Drive—3rd Gear), with engine and optional electric motor propulsion in an alternate arrangement third gear ratio (Engine Drive—3rd Gear Alt), with engine and optional electric motor propulsion in a fourth gear ratio (Engine Drive—4th Gear), as an output split hybrid transmission in a low range (Output Split Low Range), and as an output split hybrid transmission in a high range (Output Split High Range). The first clutch assembly 21 (C1), second clutch assembly 22 (C2), third clutch assembly 23 (C3), fourth clutch assembly 24 (C4), fifth clutch assembly 25 (C5), and disconnect clutch 20 (DC) may be selectively activated to achieve the different operating states of the transmission. An "X" indicates that the clutch has been activated, thereby, coupling together all components to which it is attached. A blank indicates that the clutch has been deactivated, thereby, allowing the components to which it is coupled to rotate independently of one another. In one embodiment, the first clutch assembly 21 may be replaced by a solid connection. In such an embodiment, operation in a first gear ratio would not be possible.

With reference to FIGS. 18-20, when the two motor electric drive hybrid transmission is to be operated with one electric motor providing propulsion in a low range (1 Motor EV Mode Low Range), the fifth clutch assembly 25 is activated while the first, second, third, and fourth clutch assemblies 21, 22, 23, 24 and disconnect clutch assembly 20 are deactivated. Thus, the output ring gear 43 is coupled to the transmission housing 17 by the fifth clutch assembly 25 and shaft 66. The output sun gear 41 coupled by shaft 62 to the first clutch assembly 21, the input carrier 34 coupled by shaft 63 to the second clutch assembly 22, and the input sun gear 31 coupled by shaft 64 to the third clutch assembly 23, are all free to rotate with respect to shaft 61. Shaft 61 is free to rotate with respect to the input shaft 15, and the input sun gear 31 and shaft 64 are free to rotate with respect to the transmission housing 17. EMB 12 may be powered as desired to generate propulsive force and cause the output shaft 16 to rotate.

To operate the two motor electric drive hybrid transmission with one electric motor providing propulsion in a high range (1 Motor EV Mode High Range), the fourth clutch assembly 24 is activated while the first, second, third, and fifth clutch assemblies 21, 22, 23, 25 and disconnect clutch assembly 20 are deactivated. Thus, the input sun gear 31 is coupled to the transmission housing 17 by shafts 64, 69 and the fourth clutch assembly 24. The output sun gear 41 coupled by shaft 62 to the first clutch assembly 21, the input carrier 34 coupled by shaft 63 to the second clutch assembly 22, and the input sun gear 31 coupled by shaft 64 to the third clutch assembly 23, are all free to rotate with respect to shaft 61. The input shaft 15 is free to rotate with respect to shaft 61, and the output ring gear 43 is free to rotate with respect to the transmission housing 17. EMB 12 may be powered as desired to generate propulsive force and cause the output shaft 16 to rotate.

To operate the two motor electric drive hybrid transmission as a series hybrid transmission in a low range (Series Mode Low Range), the fifth clutch assembly 25 and disconnect clutch assembly 20 are activated while the first, second, third, and fourth clutch assemblies 21, 22, 23, 24 are deactivated. Thus, output ring gear 43 is coupled to the transmission housing 17 by the fifth clutch assembly 25 and shaft 66, and the input shaft 15 is coupled to shaft 61 by the disconnect clutch assembly 20. The output sun gear 41 coupled by shaft 62 to the first clutch assembly 21, the input carrier 34 coupled by shaft 63 to the second clutch assembly 22, and the input sun gear 31 coupled by shaft 64 to the third clutch assembly 23, are all free to rotate with respect to shaft 61. The input sun gear 31 and shaft 64 are free to rotate with respect to the transmission housing 17. Power is provided by an engine coupled to the input shaft 15. The engine may be any internal combustion engine or any other power source as desired. Power from the engine causes EMA 11 to rotate and generate electrical power. The electrical power generated by EMA 11 is used to power EMB 12. EMB 12 provides the propulsive force to rotate output shaft 16.

To operate the two motor electric drive hybrid transmission as a series hybrid transmission in a high range (Series Mode High Range), the fourth clutch assembly 24 and disconnect clutch assembly 20 are activated while the first, second, third, and fifth clutch assemblies 21, 22, 23, 25 are deactivated. Thus, the input sun gear 31 is coupled to the transmission housing 17 by shafts 64, 69 and the fourth clutch assembly 24, and the input shaft 15 is coupled to shaft 61 by the disconnect clutch assembly 20. The output sun gear 41 coupled by shaft 62 to the first clutch assembly 21, the input carrier 34 coupled by shaft 63 to the second clutch assembly 22, and the input sun gear 31 coupled by shaft 64 to the third clutch assembly 23, are all free to rotate with respect to shaft 61. The output ring gear 43 is free to rotate with respect to the transmission housing 17. Power is provided by an engine coupled to the input shaft 15. Power from the engine causes EMA 11 to rotate and generate electrical power. The electrical power generated by EMA 11 is used to power EMB 12. EMB 12 provides the propulsive force to rotate output shaft 16.

To operate the two motor electric drive hybrid transmission with two electric motors providing propulsion in reverse (2 Motor EV Drive—Rev), the third and fifth clutch assemblies 23, 25 are activated, while the first, second, and fourth clutch assemblies 21, 22, 24, and disconnect clutch assembly 20 are deactivated. Thus, the shaft 61 is coupled to the input sun gear 31 through the third clutch assembly 23 and shaft 63, and the output ring gear 43 is coupled to the transmission housing 17 by the fifth clutch assembly 25 and shaft 66. The output sun gear 41 coupled by shaft 62 to the first clutch assembly 21, and the input carrier 34 coupled by shaft 63 to the second clutch assembly 22, are all free to rotate with respect to shaft 61. The input sun gear 31 and shaft 64 are free to rotate with respect to the transmission housing 17. Shaft 61 is free to rotate with respect to the input shaft 15. Both EMA 11 and EMB 12 are powered together as desired to generate propulsive force and cause the output shaft 16 to rotate.

To operate the two motor electric drive hybrid transmission with two electric motors providing propulsion in a first gear ratio (2 Motor EV Drive—1st Gear), the first and fifth clutch assemblies 21, 25 are activated, while the second, third, and fourth clutch assemblies 22, 23, 24, and disconnect clutch assembly 20 are deactivated. Thus, the shaft 61 is coupled to the output sun gear through the first clutch assembly 21 and shaft 62, and the output ring gear 43 is coupled to the transmission housing 17 by the fifth clutch assembly 25 and shaft 66. The input carrier 34 coupled by shaft 63 to the second clutch assembly 22, and the input sun gear 31 coupled by shaft 64 to the third clutch assembly 23, are all free to rotate with respect to shaft 61. The input sun gear 31 and shaft 64 are free to rotate with respect to the transmission housing 17. Shaft 61 is free to rotate with respect to the input shaft 15. Both EMA 11 and EMB 12 are powered together as desired to generate propulsive force and cause the output shaft 16 to rotate.

To operate the two motor electric drive hybrid transmission with two electric motors providing propulsion in a second gear ratio (2 Motor EV Drive—2nd Gear), the first and fourth clutch assemblies 21, 24 are activated, while the second, third, and fifth clutch assemblies 22, 23, 25, and disconnect clutch assembly 20 are deactivated. Thus, the shaft 61 is coupled to the output sun gear through the first clutch assembly 21 and shaft 62, and the input sun gear 31 is coupled to the transmission housing 17 by shafts 64, 69 and the fourth clutch assembly 24. The input carrier 34 coupled by shaft 63 to the second clutch assembly 22, and the input sun gear 31 coupled by shaft 64 to the third clutch assembly 23, are all free to rotate with respect to shaft 61. The output ring gear 43 is free to rotate with respect to the transmission housing 17. Shaft 61 is free to rotate with respect to the input shaft 15. Both EMA 11 and EMB 12 are powered together as desired to generate propulsive force and cause the output shaft 16 to rotate.

To operate the two motor electric drive hybrid transmission with two electric motors providing propulsion in a third gear ratio (2 Motor EV Drive—3rd Gear), the first and second clutch assemblies 21, 22 are activated, while the third, fourth, and fifth clutch assemblies 23, 24, 25, and disconnect clutch assembly 20 are deactivated. Thus, shaft 61 is coupled to the output sun gear 41 through the first clutch assembly 21 and shaft 62, and shaft 61 is coupled to the input carrier 34 through the second clutch assembly and shaft 63. The input sun gear 31 coupled by shaft 64 to the third clutch assembly 23 is free to rotate with respect to shaft 61 and with respect to the transmission housing 17. The output ring gear 43 is free to rotate with respect to the transmission housing 17. Shaft 61 is free to rotate with respect to the input shaft 15. Both EMA 11 and EMB 12 are powered together as desired to generate propulsive force and cause the output shaft 16 to rotate.

To operate the two motor electric drive hybrid transmission with two electric motors providing propulsion in an alternate arrangement third gear ratio (2 Motor EV Drive—3rd Gear Alt), the second and third clutch assemblies 22, 23 are activated, while the first, fourth, and fifth clutch assemblies 21, 24, 25, and disconnect clutch assembly 20 are deactivated. Thus, shaft 61 is coupled to the input carrier 34 through the second clutch assembly and shaft 63, and shaft 61 is coupled to the input sun gear 31 through the third clutch assembly 23 and shaft 63. The output sun gear 41 coupled by shaft 62 to the first clutch assembly 21 is free to rotate with respect to shaft 61. The input sun gear 31 and shafts 64, 69 are free to rotate with respect the transmission housing 17, and the output ring gear 43 is free to rotate with respect to the transmission housing 17. Shaft 61 is free to rotate with respect to the input shaft 15. Both EMA 11 and EMB 12 are powered together as desired to generate propulsive force and cause the output shaft 16 to rotate.

To operate the two motor electric drive hybrid transmission with two electric motors providing propulsion in a fourth gear ratio (2 Motor EV Drive—4th Gear), the second and fourth clutch assemblies 22, 24 are activated, while the first, third, and fifth clutch assemblies 21, 23, 25 and disconnect clutch assembly 20 are deactivated. Thus, shaft 61 is coupled to the input carrier 34 through the second clutch assembly and shaft 63, and the input sun gear 31 is coupled to the transmission housing 17 by shafts 64, 69 and the fourth clutch assembly 24. The output sun gear 41 coupled by shaft 62 to the first clutch assembly 21, and input sun gear 31 coupled by shaft 64 to the third clutch assembly 23, are all free to rotate with respect to shaft 61. The output ring gear 43 is free to rotate with respect to the transmission housing 17. Shaft 61 is free to rotate with respect to the input shaft 15. Both EMA 11 and EMB 12 are powered together as desired to generate propulsive force and cause the output shaft 16 to rotate.

To operate the two motor electric drive hybrid transmission with two electric motors providing propulsion in a low range (2 Motor EV Drive—Low Range), the third and fifth clutch assemblies 23, 25 are activated while the first, second, and fourth clutch assemblies 21, 22, 24 and disconnect clutch assembly 20 are deactivated. Thus, shaft 61 is coupled to the input sun gear 31 through the third clutch assembly 23 and shaft 63, and the output ring gear 43 is coupled to the transmission housing 17 by the fifth clutch assembly 25 and shaft 66. The output sun gear 41 coupled by shaft 62 to the first clutch assembly 21, and the input carrier 34 coupled by shaft 63 to the second clutch assembly 22, are all free to rotate with respect to shaft 61. The input sun gear 31 and shafts 64, 69 are free to rotate with respect the transmission housing 17. Shaft 61 is free to rotate with respect to the input shaft 15. Both EMA 11 and EMB 12 are powered together as desired to generate propulsive force and cause the output shaft 16 to rotate.

To operate the two motor electric drive hybrid transmission with two electric motors providing propulsion in a medium range (2 Motor EV Drive—Med Range), the second and fourth clutch assemblies 22, 24 are activated while the first, third, and fifth clutch assemblies 21, 23, 25 and disconnect clutch assembly 20 are deactivated. Thus, the shaft 61 is coupled to the input carrier 34 through the second clutch assembly and shaft 63, and the input sun gear 31 is coupled to the transmission housing 17 by shafts 64, 69 and the fourth clutch assembly 24. The output sun gear 41 coupled by shaft 62 to the first clutch assembly 21, and the input sun gear 31 coupled by shaft 64 to the third clutch assembly 23, are all free to rotate with respect to shaft 61. The output ring gear 43 is free to rotate with respect to the transmission housing 17. Shaft 61 is free to rotate with respect to the input shaft 15, and the output ring gear 43 is free to rotate with respect to the transmission housing 17. Both EMA 11 and EMB 12 are powered together as desired to generate propulsive force and cause the output shaft 16 to rotate.

To operate the two motor electric drive hybrid transmission with engine and optional electric motor propulsion in reverse (Engine Drive—Rev), the third and fifth clutch assemblies 23, 25 and disconnect clutch assembly 20 are activated while the first, second, and fourth clutch assemblies 21, 22, 24 are deactivated. Thus, shaft 61 is coupled to the input sun gear 31 through the third clutch assembly 23 and shaft 64, the output ring gear 43 is coupled to the transmission housing 17 by the fifth clutch assembly 25 and shaft 66, the input shaft 15 is coupled to shaft 61 by the disconnect clutch assembly 20. The output sun gear 41 coupled by shaft 62 to the first clutch assembly 21, and the input carrier 34 coupled by shaft 63 to the second clutch assembly 22, are all free to rotate with respect to shaft 61. Propulsive power to rotate output shaft 12 is provided by an engine coupled to the input shaft 15. Additional propulsive power may be provided by EMA 11 and EMB 12 as desired.

To operate the two motor electric drive hybrid transmission with engine and optional electric motor propulsion in a first gear ratio (Engine Drive—1st Gear), the first and fifth clutch assemblies 21, 25 and disconnect clutch assembly 20 are activated while the second, third, and fourth clutch assemblies 22, 23, 24 are deactivated. Thus, the shaft 61 is coupled to the output sun gear 41 through the first clutch assembly 21 and shaft 62, the output ring gear 43 is coupled to the transmission housing 17 by the fifth clutch assembly 25 and shaft 66, and the input shaft 15 is coupled to shaft 61 by the disconnect clutch assembly 20. The input carrier 34 coupled by shaft 63 to the second clutch assembly 22, and the input sun gear 31 coupled by shaft 64 to the third clutch assembly 23, are all free to rotate with respect to shaft 61. The input sun gear 31 and shaft 64 are free to rotate with respect to the transmission housing 17. Propulsive power to rotate output shaft 12 is provided by an engine coupled to the input shaft 15. Additional propulsive power may be provided by EMA 11 and EMB 12 as desired.

To operate the two motor electric drive hybrid transmission with engine and optional electric motor propulsion in a second gear ratio (Engine Drive—2nd Gear), the first and fourth clutch assemblies 21, 24 and disconnect clutch assembly 20 are activated, while the second, third, and fifth clutch assemblies 22, 23, 25 are deactivated. Thus, the shaft 61 is coupled to the output sun gear 41 through the first clutch assembly 21 and shaft 62, the input sun gear 31 is coupled to the transmission housing 17 by shafts 64, 69 and the fourth clutch assembly 24, and the input shaft 15 is coupled to shaft 61 by the disconnect clutch assembly 20. The input carrier 34 coupled by shaft 63 to the second clutch assembly 22, and the input sun gear 31 coupled by shaft 64 to the third clutch assembly 23, are all free to rotate with respect to shaft 61. The output ring gear 43 is free to rotate with respect to the transmission housing 17. Propulsive power to rotate output shaft 12 is provided by an engine coupled to the input shaft 15. Additional propulsive power may be provided by EMA 11 and EMB 12 as desired.

To operate the two motor electric drive hybrid transmission with engine and optional electric motor propulsion in a third gear ratio (Engine Drive—3rd Gear), the first and second clutch assemblies 21, 22 and disconnect clutch assembly 20 are activated, while the third, fourth, and fifth clutch assemblies 23, 24, 25 are deactivated. Thus, shaft 61 is coupled to the output sun gear 41 through the first clutch assembly 21 and shaft 62, shaft 61 is coupled to the input carrier 34 through the second clutch assembly and shaft 63, and the input shaft 15 is coupled to shaft 61 by the disconnect clutch assembly 20. The input sun gear 31 coupled by shaft 64 to the third clutch assembly 23 is free to rotate with respect to shaft 61 and with respect to the transmission housing 17. The output ring gear 43 is free to rotate with respect to the transmission housing 17. Propulsive power to rotate output shaft 12 is provided by an engine coupled to the input shaft 15. Additional propulsive power may be provided by EMA 11 and EMB 12 as desired.

To operate the two motor electric drive hybrid transmission with engine and optional electric motor propulsion in an alternate arrangement third gear ratio (Engine Drive—3rd Gear Alt), the second and third clutch assemblies 22, 23 and disconnect clutch assembly 20 are activated, while the first, fourth, and fifth clutch assemblies 21, 24, 25 are deactivated. Thus, shaft 61 is coupled to the input carrier 34 through the second clutch assembly and shaft 63, shaft 61 is coupled to the input sun gear 31 through the third clutch assembly 23 and shaft 64, and the input shaft 15 is coupled to shaft 61 by the disconnect clutch assembly 20. The output sun gear 41 coupled by shaft 62 to the first clutch assembly 21 is free to rotate with respect to shaft 61. The input sun gear 31 and shafts 64, 69 are free to rotate with respect the transmission housing 17, and the output ring gear 43 is free to rotate with respect to the transmission housing 17. Propulsive power to rotate output shaft 12 is provided by an engine coupled to the input shaft 15. Additional propulsive power may be provided by EMA 11 and EMB 12 as desired.

To operate the two motor electric drive hybrid transmission with engine and optional electric motor propulsion in a fourth gear ratio (Engine Drive—4th Gear), the second and fourth clutch assemblies 22, 24 and disconnect clutch assembly 20 are activated, while the first, third, and fifth clutch assemblies 21, 23, 25 are deactivated. Thus, shaft 61 is coupled to the input carrier 34 through the second clutch assembly 22 and shaft 63, the input sun gear 31 is coupled to the transmission housing 17 by shafts 64, 69 and the fourth clutch assembly 24, and the input shaft 15 is coupled to shaft 61 by the disconnect clutch assembly 20. The output sun gear 41 coupled by shaft 62 to the first clutch assembly 21, and input sun gear 31 coupled by shaft 64 to the third clutch assembly 23, are all free to rotate with respect to shaft 61. The output ring gear 43 is free to rotate with respect to the transmission housing 17. Propulsive power to rotate output shaft 12 is provided by an engine coupled to the input shaft 15. Additional propulsive power may be provided by EMA 11 and EMB 12 as desired.

To operate the two motor electric drive hybrid transmission as an output split hybrid transmission in a low range (Output Split Low Range), the third clutch assembly 23 and disconnect clutch assembly 20 are activated while the first, second, fourth, and fifth clutch assemblies 21, 22, 24, 25 are deactivated. Thus, shaft 61 is coupled to the input sun gear 31 through the third clutch assembly 23 and shaft 64, and the input shaft 15 is coupled to shaft 61 by the disconnect clutch assembly 20. The output sun gear 41 coupled by shaft 62 to the first clutch assembly 21, and the input carrier 34 coupled by shaft 63 to the second clutch assembly 22, are all free to rotate with respect to shaft 61. The input sun gear 31 and shafts 64, 69 are free to rotate with respect the transmission housing 17, and the output ring gear 43 is free to rotate with respect to the transmission housing 17. Propulsive power is provided by a combination of an engine coupled to the input shaft 15 and EMB 12, EMA 11 may be selectively used to generate electrical power while EMB 12 and the engine provide propulsive power. Alternatively, propulsion may be provided by a combination of the engine, EMA 11 and EMB 12.

To operate the two motor electric drive hybrid transmission as an output split hybrid transmission in a high range (Output Split High Range), the second clutch assembly 22 and disconnect clutch assembly 20 are activated while the first, third, fourth, and fifth clutch assemblies 21, 23, 24, 25 are deactivated. Thus, shaft 61 is coupled to the input carrier 34 through the second clutch assembly 22 and shaft 63, and the input shaft 15 is coupled to shaft 61 by the disconnect clutch assembly 20. The output sun gear 41 coupled by shaft 62 to the first clutch assembly 21, and input sun gear 31 coupled by shaft 64 to the third clutch assembly 23, are all free to rotate with respect to shaft 61. The input sun gear 31 and shafts 64, 69 are free to rotate with respect the transmission housing 17, and the output ring gear 43 is free to rotate with respect to the transmission housing 17. Propulsive power is provided by a combination of an engine coupled to the input shaft 15 and EMB 12. EMA 11 may be selectively used to generate electrical power while EMB 12 and the engine provide propulsive power. Alternatively, propulsion may be provided by a combination of the engine, EMA 11 and EMB 12.

In the embodiment of FIG. 18 in which the first clutch assembly 21 is constantly locked or omitted, the two motor electric drive hybrid transmission is incapable of operating in those modes which require the first clutch assembly 21 to be deactivated. Thus, absent the first clutch assembly 21, the two motor electric drive hybrid transmission is incapable of operating in 1 Motor EV Mode Low Range, 1 Motor EV Mode High Range, Series Mode Low Range, Series Mode High Range, 2 Motor EV Drive—Rev, 2 Motor EV Drive—3rd Gear Alt, 2 Motor EV Drive—4th Gear, 2 Motor EV Drive—Low Range, 2 Motor EV Drive—Med Range, Engine Drive—Rev, Engine Drive—3rd Gear Alt, Engine Drive—4th Gear, Output Split Low Range, and Output Split High Range. The two motor electric drive hybrid transmission with the first clutch assembly 21 constantly locked or omitted operates identically to the two motor electric drive hybrid transmission with the first clutch assembly 21 when operating in 2 Motor EV Drive—1st Gear, 2 Motor EV Drive—2nd Gear, 2 Motor EV Drive—3rd Gear, Engine Drive—1st Gear, Engine Drive—2nd Gear, and Engine Drive—3rd Gear.

In the embodiment of FIG. 18 in which the fourth clutch assembly 24 and shaft 69 are omitted, the two motor electric drive hybrid transmission is incapable of operating in those modes which require the fourth clutch assembly 24 to be activated. Thus, absent the fourth clutch assembly 24 and shaft 69, the two motor electric drive hybrid transmission is incapable of operating in 1 Motor EV Mode High Range, Series Mode High Range, 2 Motor EV Drive—2nd Gear, 2 Motor EV Drive—4th Gear, 2 Motor EV Drive—Med Range, Engine Drive—2nd Gear, and Engine Drive—4th Gear. The two motor electric drive hybrid transmission without the fourth clutch assembly 24 and shaft 69 operates identically to the two motor electric drive hybrid transmission with the fourth clutch assembly 24 and shaft 69 when operating in 1 Motor EV Mode Low Range, Series Mode Low Range, 2 Motor EV Drive—Rev, 2 Motor EV Drive—1st Gear, 2 Motor EV Drive—3rd Gear, 2 Motor EV Drive—3rd Gear Alt, 2 Motor EV Drive—Low Range, Engine Drive—Rev, Engine Drive—1st Gear, Engine Drive—3rd Gear, Engine Drive—3rd Gear Alt, Output Split Low Range, and Output Split High Range.

The disclosed embodiments of the two motor electric drive hybrid transmission utilize two electric motors EMA 11 and EMB 12 coupled to planetary gear sets to maximize the performance of the two motor electric drive hybrid transmission. For example, by coupling the two electric motors EMA 11 and EMB 12 to planetary gear sets, the torque output of the two electric motors EMA 11 and EMB 12 may be amplified at the output shaft 16. In one embodiment, the revolutions per minute of the two electric motors EMA 11 and EMB 12 is amplified at the output shaft 16. In addition, the disclosed embodiments enable the use of both electric motors EMA 11 and EMB 12 regardless of whether an engine is providing a torque to the input shaft 15. Also, overall transmission efficiency is improved by limiting the number of gears and planetary gear sets in the two motor electric drive hybrid transmission. However, in one embodiment, gears may be added to the two motor electric drive hybrid transmission to achieve desired functionality or gear ratios. In some embodiments, EMA 11 or EMB 12 may be used to start an engine attached to the input shaft 15. In some embodiments, an advanced engine starter, a larger version of a conventional engine starter motor, may be used. In some embodiments, the compact packaging of the two motor electric drive hybrid transmission is ideal for use in a front wheel drive vehicle. The configuration of the two motor electric drive hybrid transmission may also be ideal for rear wheel drive vehicles in some configurations.

In one embodiment, the clutches and disconnect clutch may be any type of clutch including, but not limited to, a dry, wet, or multi-plate clutch. The disconnect clutch may be used to start the vehicle's internal combustion engine when the vehicle is in motion under electric propulsion. In one embodiment, the disconnect clutch may be slipped during the starting procedure, thereby minimizing any jolting or passenger discomfort that might otherwise be caused during the engine start procedure. In one embodiment, the engine may any type of engine or torque source including, but not limited to, piston, turbine, electric, hydraulic, or pneumatic. In one embodiment, the electric motors EMA 11 and EMB 12 may be any type of electric motor or torque source including, but not limited to, electric, hydraulic, or pneumatic.

What is claimed is:

1. A hybrid transmission comprising:
   a transmission housing;
   an input shaft;
   a first clutch assembly;
   a first shaft coupled to said first clutch assembly;
   an input planetary gear set coupled to said first shaft, wherein said first clutch assembly selectively couples said input shaft to said first shaft;
   a first electric motor coupled to said input planetary gear set;
   an output planetary gear set coupled to said input planetary gear set;
   a second electric motor coupled to said output planetary gear set;
   an output shaft coupled to said output planetary gear set;
   a second clutch assembly coupled to an input ring gear of said input planetary gear set; and
   a third clutch assembly coupling an output carrier of said output planetary gear set to said transmission housing;
   wherein an input carrier of said input planetary gear set and an output ring gear of said output planetary gear set are coupled to said output shaft.

2. The hybrid transmission of claim 1, wherein said first clutch assembly is a disconnect clutch.

3. The hybrid transmission of claim 2, wherein:
   said first shaft is coupled to said input ring gear;
   said first electric motor is coupled to a sun gear of said input planetary gear set;
   said input ring gear of said input planetary gear set is coupled to said output carrier of said output planetary gear set by said second clutch mechanism; and
   said second electric motor is coupled to an output sun gear of said output planetary gear set.

4. The hybrid transmission of claim 3, wherein said third clutch assembly selectively couples said output carrier to said transmission housing.

5. A hybrid powertrain comprising:
   a transmission housing;
   an input shaft;
   a first clutch assembly;
   a first shaft coupled to said first clutch assembly;
   an input planetary gear set coupled to said first shaft, wherein said first clutch assembly selectively couples said input shaft to said first shaft;
   a first electric motor coupled to an input sun gear of said input planetary gear set;
   an output planetary gear set coupled to said input planetary gear set;
   a second electric motor coupled to an output sun gear of said output planetary gear set;
   an output shaft coupled to said output planetary gear set;
   a second clutch assembly coupled to an input ring gear of said input planetary gear set; and
   a third clutch assembly coupling an output carrier of said output planetary gear set to said transmission housing;
   wherein an input carrier of said input planetary gear set and an output ring gear of said output planetary gear set are coupled to said output shaft.

6. The hybrid powertrain of claim 5, wherein said input planetary gear set and said output planetary gear set amplify the torque applied by said first electric motor and said second electric motor to said output shaft.

7. The hybrid powertrain of claim 5, wherein:
   said first shaft is coupled to said input ring gear;
   said input ring gear is coupled to said output carrier by said second clutch mechanism; and
   said third clutch assembly selectively couples said output carrier to said transmission housing.

8. The hybrid powertrain of claim 5, wherein said first clutch assembly is a disconnect clutch.

\* \* \* \* \*